United States Patent
Watanabe et al.

(10) Patent No.: US 6,607,798 B1
(45) Date of Patent: Aug. 19, 2003

(54) FIBER-REINFORCED COMPOSITE HOLLOW STRUCTURE, METHOD FOR PRODUCTION THEREOF, AND APPARATUS THEREFOR

(76) Inventors: Toru Watanabe, Ube-Nitto Kasei Co., LTD Gifu Research Laboratory 2-1-1, Yabutanishi, Gifu-shi, Gifu 500-8386 (JP); Shigehiro Matsuno, Ube-Nitto Kasei Co., LTD Gifu Research Laboratory 2-1-1, Yabutanishi, Gifu-shi, Gifu 500-8386 (JP); Naoyuki Kondo, Ube-Nitto Kasei Co., LTD Gifu Research Laboratory 2-1-1, Yabutanishi, Gifu-shi, Gifu 500-8386 (JP); Takayuki Hoshino, Ube-Nitto Kasei Co., LTD Gifu Research Laboratory 2-1-1, Yabutanishi, Gifu-shi, Gifu 500-8386 (JP); Hidenori Nomura, Ube-Nitto Kasei Co., LTD Gifu Research Laboratory 2-1-1, Yabutanishi, Gifu-shi, Gifu 500-8386 (JP)

( * ) Notice: Subject to any disclaimer, the term of this patent is extended or adjusted under 35 U.S.C. 154(b) by 0 days.

(21) Appl. No.: 09/530,502
(22) PCT Filed: Aug. 2, 1998
(86) PCT No.: PCT/JP98/01535
§ 371 (c)(1), (2), (4) Date: Jul. 20, 2000
(87) PCT Pub. No.: WO99/24251
PCT Pub. Date: May 20, 1999

(30) Foreign Application Priority Data

Nov. 7, 1997 (JP) .............................. 9-305372
Jan. 19, 1998 (JP) .......................... 10-007514

(51) Int. Cl.⁷ ............................................. B29D 23/00
(52) U.S. Cl. ................... 428/36.5; 428/304.4; 428/613; 428/34.1; 428/34.9; 428/35.7; 428/291.1
(58) Field of Search .......................... 428/292.1, 304.4, 428/402.2, 613, 34.1, 34.7, 35.7, 36.5

(56) References Cited

U.S. PATENT DOCUMENTS 4,923,203 A * 5/1990 Trumble et al. ......... 280/288.3

FOREIGN PATENT DOCUMENTS

| JP | 1-150857 | 10/1989 |
|----|----------|---------|
| JP | 5-73154  | 10/1993 |
| JP | 08-184126 | 7/1996 |
| JP | 08-326306 | 12/1996 |

* cited by examiner

Primary Examiner—Merrick Dixon
(74) Attorney, Agent, or Firm—Arter & Hadden LLP

(57) ABSTRACT

Center cores are formed by extrusion-molding ABS resin. Seven pieces of the center cores, which are juxtaposed to each other in the horizontal direction, are supplied by a pultruder, and reinforcing long-fibers impregnated with an unsaturated polyester resin are allowed to pass through dispersion guides and squeezing nozzles, to thus squeezing-mold a fiber-reinforced composite hollow structure having FRP made legs. A final squeezing nozzle is disposed in a cross head die through a cooling jacket, and the hollow structure thus molded is allowed to pass therethrough to be covered with the ABS resin in a state in which the outer periphery of the hollow structure is heated. The hollow structure thus covered is subjected to cooled-sizing through a plurality of horizontal and vertical pairs of rollers, and then cured in a hot curing tank. The surface covered with the ABS resin is subjected to a surface-treatment of imparting irregularities for giving an antislipping function to the surface. A thermoplastic resin-made protective cap is fitted to an end of the center core. The apparatus for manufacturing a composite hollow structure has a plurality of pairs of rotatable and heat-resisting sizing rollers. The plurality of pairs of the sizing rollers are disposed in the pultruding direction while being gradually cooled in the order from those positioned on the upstream side to those positioned on the downstream side for sizing the softened outer layer covering the outer periphery of the intermediate layer.

8 Claims, 19 Drawing Sheets

FIG. 2
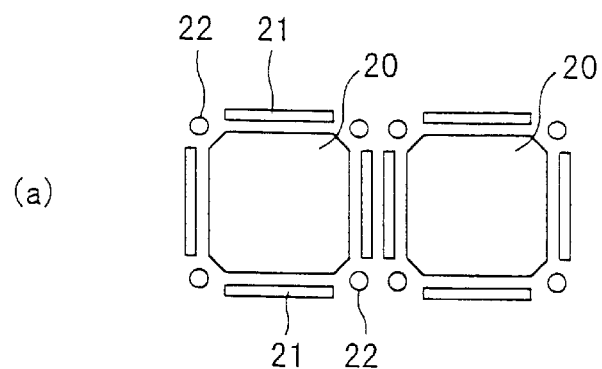
(a)
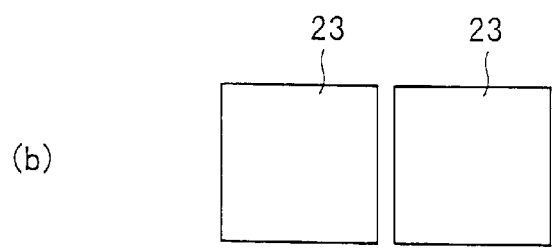
(b)
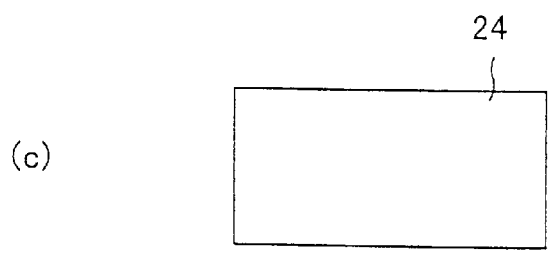
(c)
FIG. 3
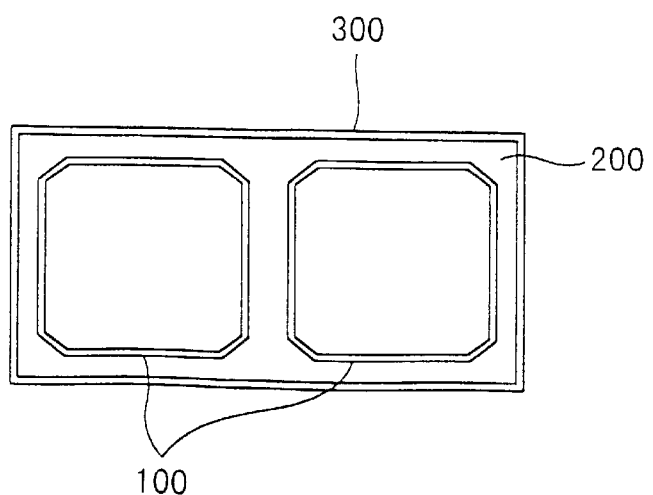

FIG. 4
(a) 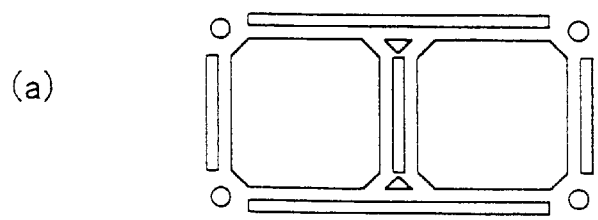
(b) 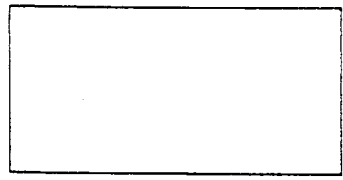
FIG. 5
(a) 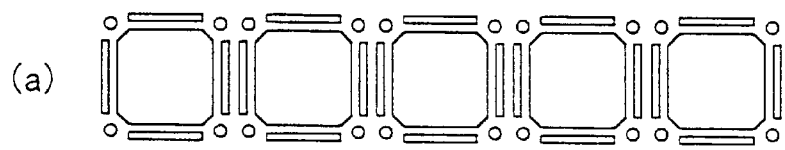
(b) 
(c) 

FIG. 16
(a)
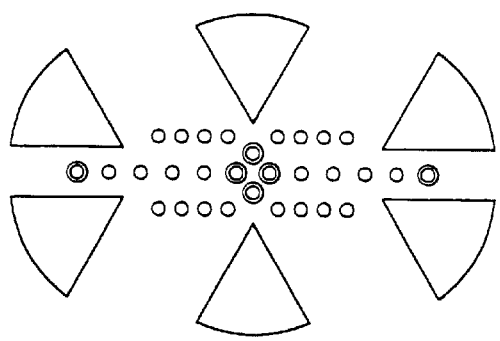
(b)
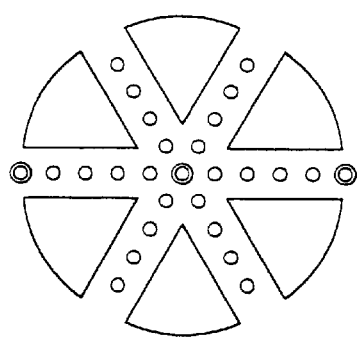
(c)
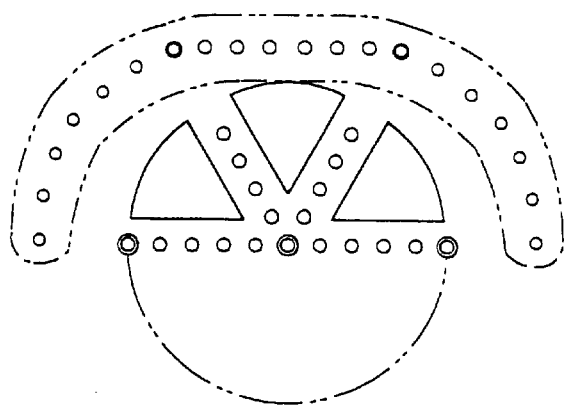
(d)
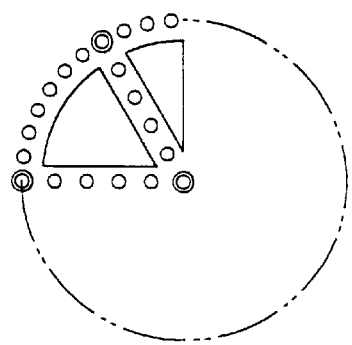
(e)
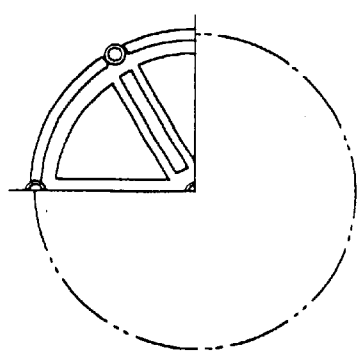
(f)
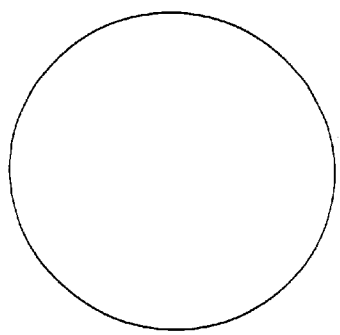

FIG. 20
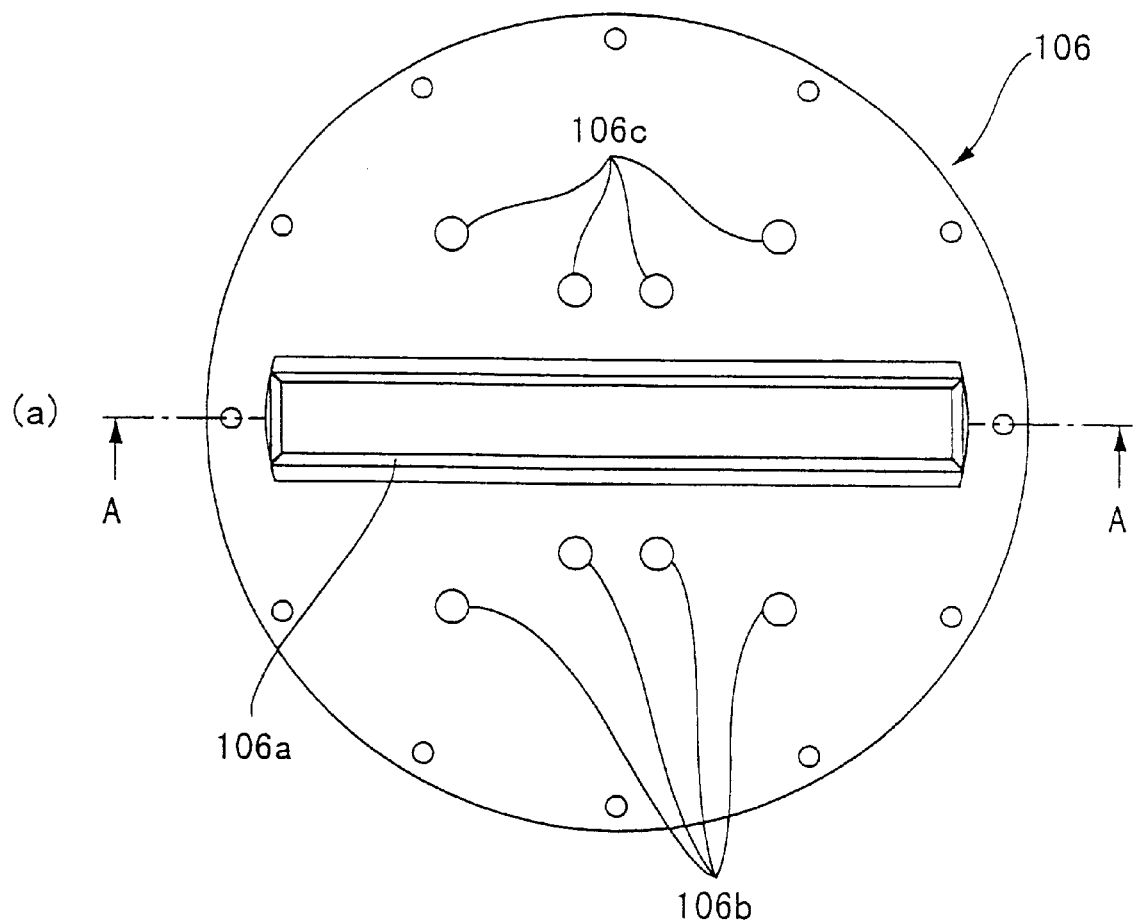
(a)
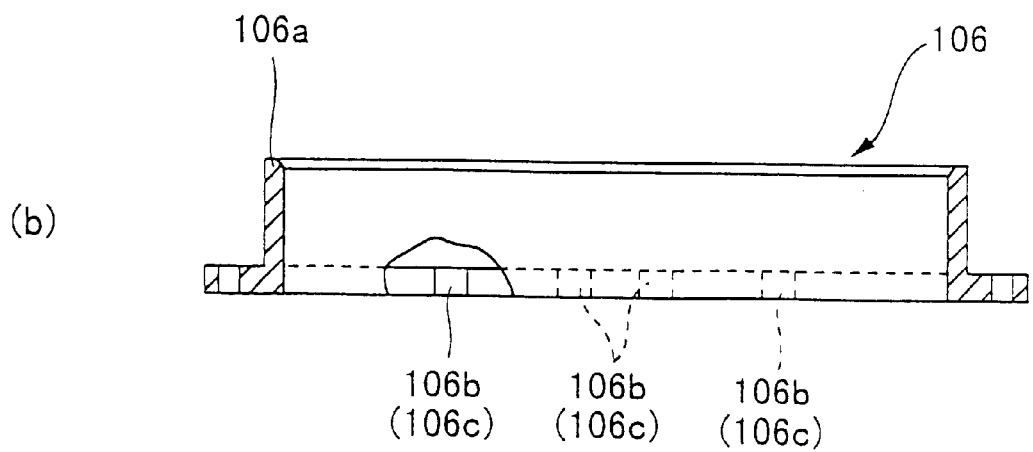
(b)

F I G. 21
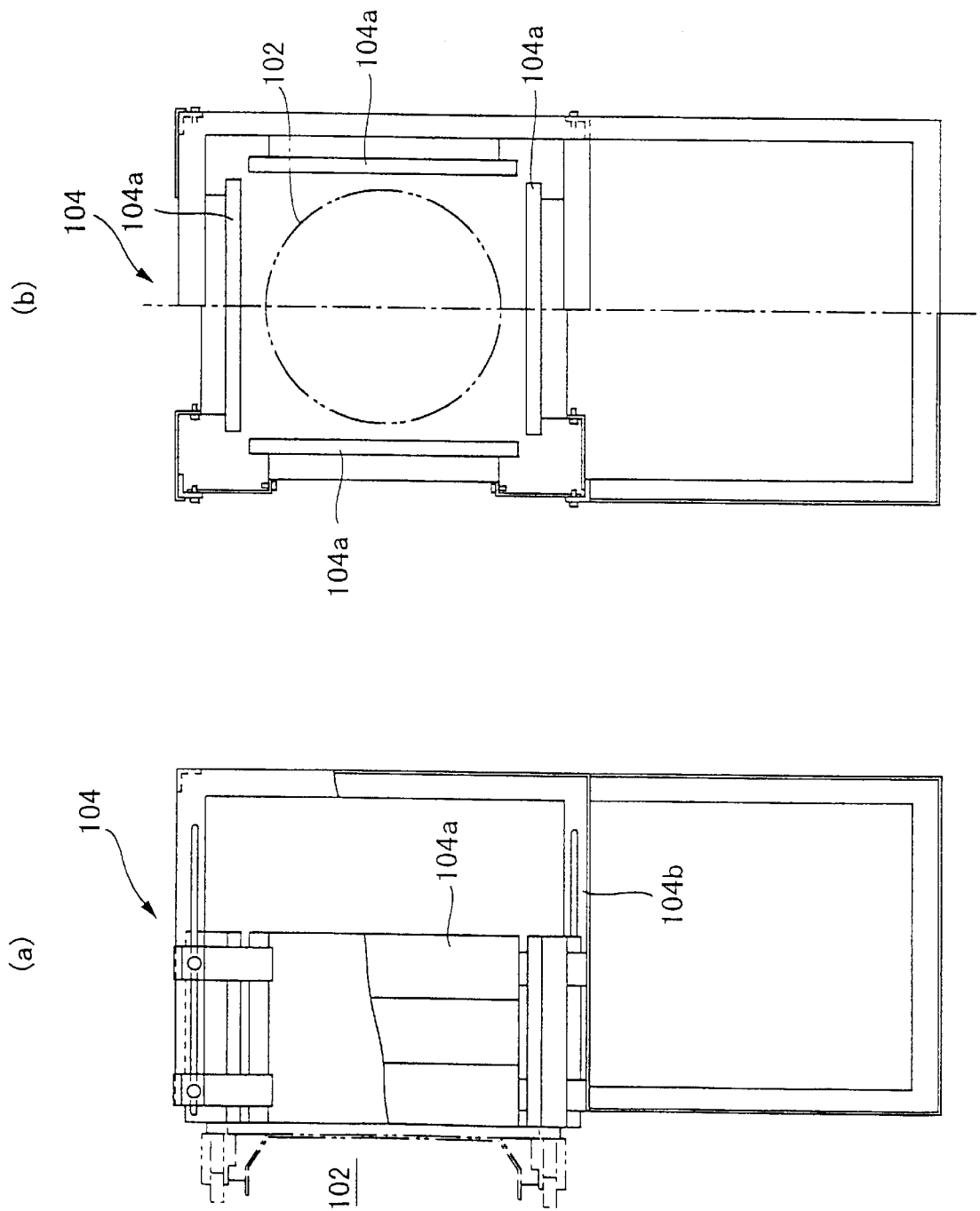

FIG. 23
(a)
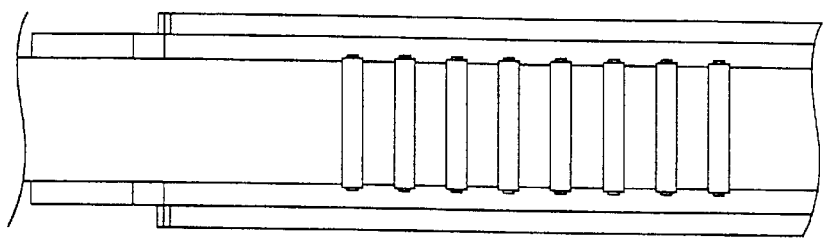
(b)
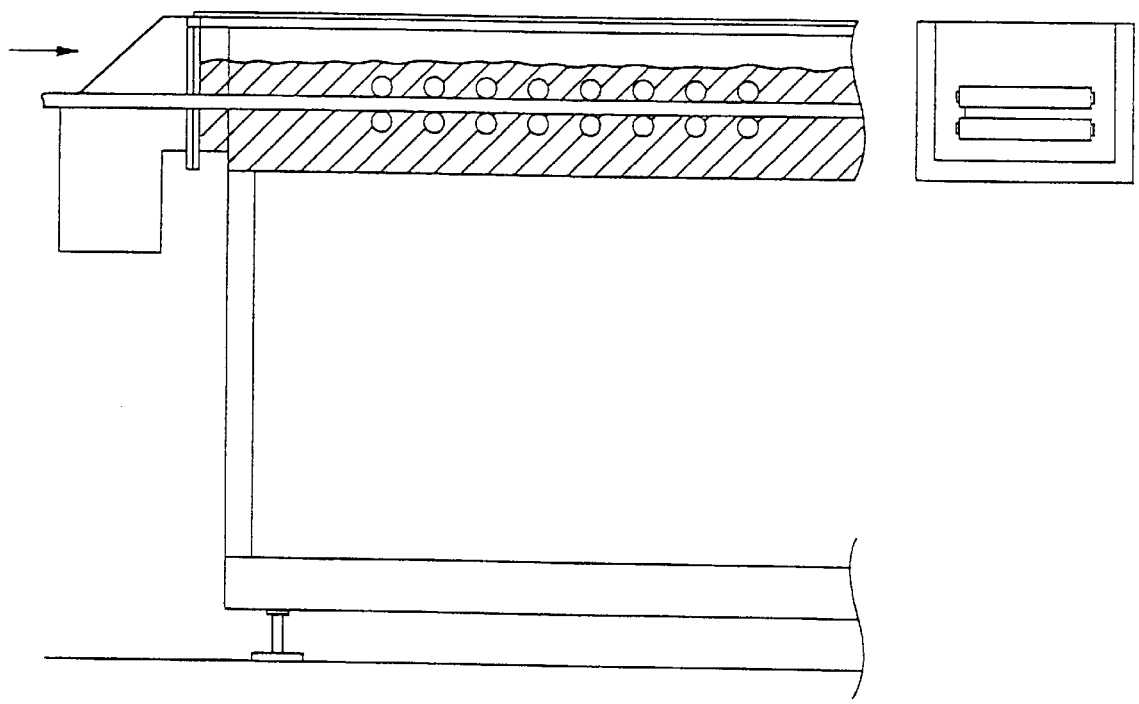

FIG. 24
(a)
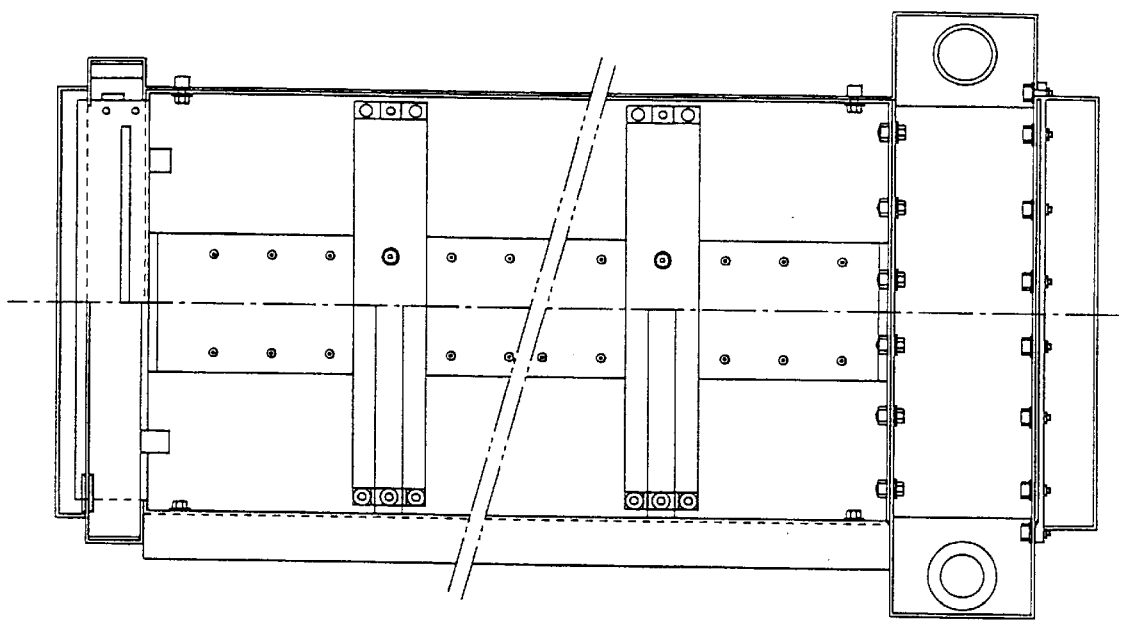
(b)
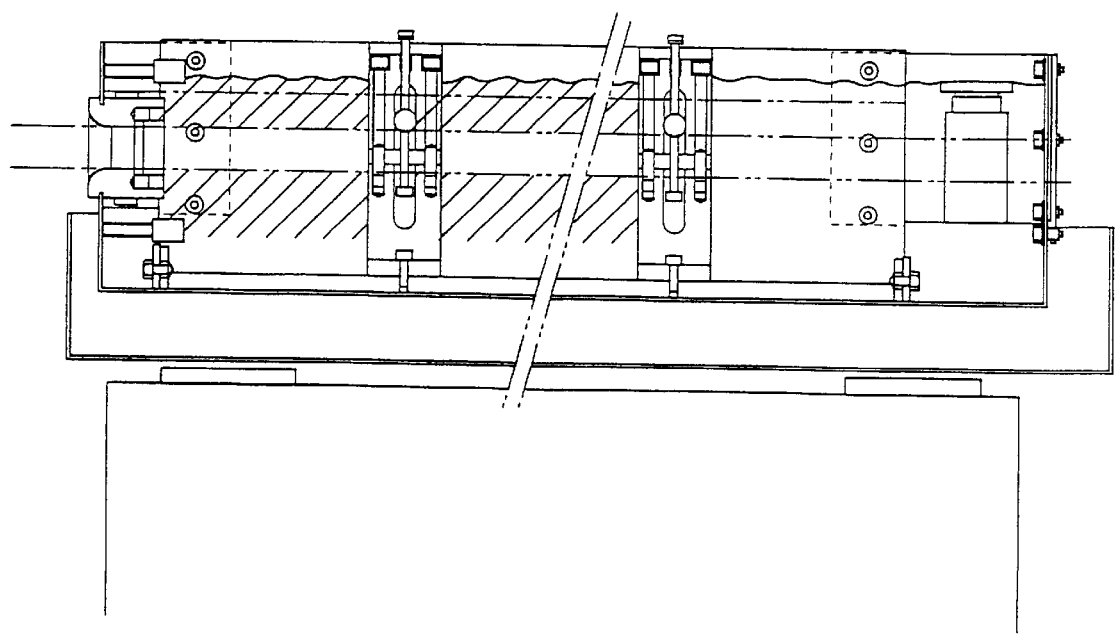

FIG. 26
(a) 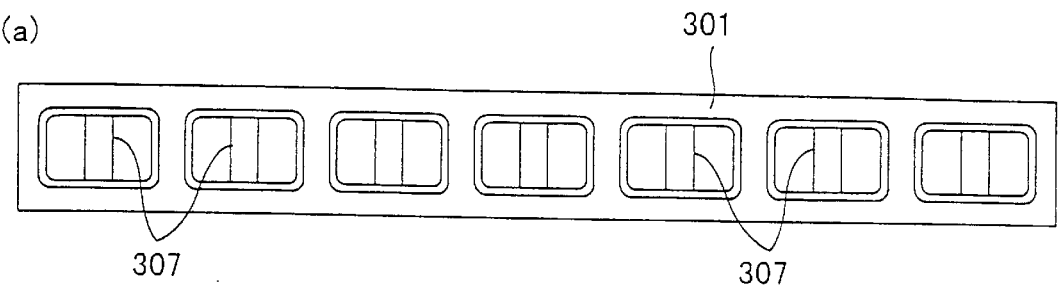
(b) 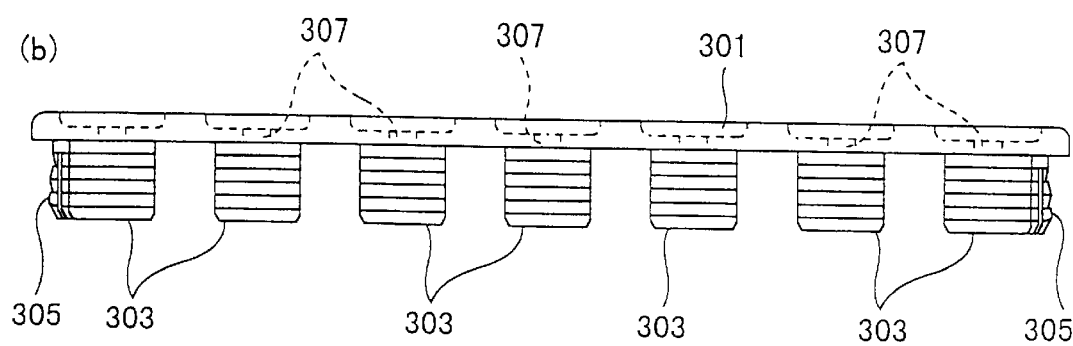
(c) 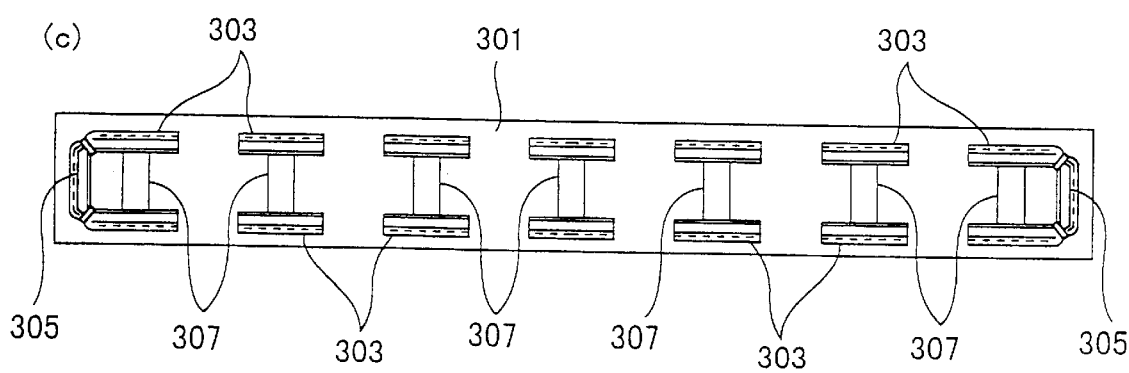
(d) 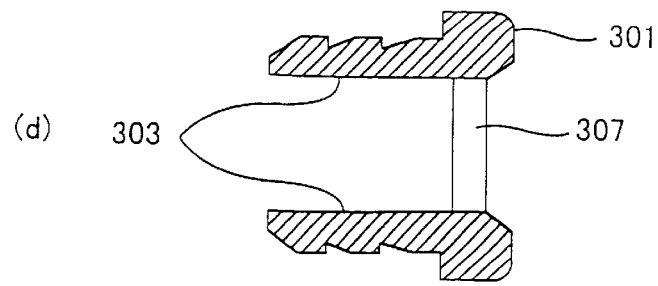

FIBER-REINFORCED COMPOSITE HOLLOW STRUCTURE, METHOD FOR PRODUCTION THEREOF, AND APPARATUS THEREFOR

TECHNICAL FIELD

The present invention relates to a fiber-reinforced composite hollow structure, and a method and an apparatus for manufacturing the same. Particularly, this invention relates to a fiber-reinforced composite hollow structure which can be suitably used as a structural member with reduced weight, increased strength, and enhanced dimensional accuracy, and especially, to a fiber-reinforced composite hollow structure which is a composite hollow structure used preferably as a scaffold board for temporary construction works, and also to a method and an apparatus for quickly manufacturing the same with a high efficiency.

BACKGROUND ART (1) Supports, called battens, are used for installation of concrete forms in construction works or civil engineering works. In general, battens are made from steel or aluminum; however, they are heavy, and susceptible to rusting and adhesion of concrete. Because of these problems, some of battens are formed of FRP-made pipes with reduced weight, increased strength, and enhanced corrosion resistance.

Also there is a tendency to use FRP hollow members molded by pultrusion as structural members for various structures such as columns, posts, fences and scaffold boards. In such a FRP hollow member, one side or diameter in cross-section is increased over 60 mm or more. When pultruding of a FRP hollow member having such a large cross-section is implemented, if the pultruding is performed using a curing die, there may occur problems such as: the die is enlarged in size and complicated in structure; a large pultruder must be employed because of the significantly increased pultruding resistance; and the die cost becomes higher because of the need of increasing the die strength. Also, there is a problem such that the pultruding rate is as slow as 1 m/min or less.

As a FRP pipe, there is known a composite pipe, (for example, trade name "Compose", produced by UBE-NITTO KASEI Co., LTD.) which has a three-layer integrated structure including an inner tubular layer (hereinafter, referred to as "center core") made from thermoplastic resin, an intermediate layer made from FRP, and an outer cover layer made from thermoplastic resin. Such a composite pipe having a three-layer structure does not use any curing die and is subjected to curing with its shape kept by the center core and outer cover layer, and consequently, it has an advantage since the curing/molding rate becomes fast, and it is economical because of the significantly reduced costs of parts such as for the die. Of these composite pipes, a square-type pipe has a rectangular-like sectional shape with one side being relatively large as 50 to 60 mm; therefore, to keep the compressive strength and bending strength, the respective wall thickness of the intermediate layer and the center core is set to have large value. This not only disregards the significance of the reduction in weight, but also exhibits points to be improved in terms of resource saving and cost efficiency, with an additional inconvenience that the dimensional accuracy of the hollow portion is insufficient.

Another problem is that if the curing temperature is higher than the thermal deformation temperature of a thermoplastic resin which forms the center core, the center core is liable to be softened and deformed, leading to deformation of the cross-section of the final product.

For a composite pipe with the dimension of one side increased over 60 mm, the wall thickness of the center core and the intermediate layer is required to be increased. In this case, since there occurs a problem that the cross-section is liable to be deformed, the thickness of the center core is required to be further increased for suppressing this problem. This is because when the thickness of the intermediate layer is increased, heat generation caused by curing of FRP becomes larger, with a result that the strength of the center core is reduced and the center core is liable to be deformed. Also the contraction caused by curing becomes larger, with a result that the side portion is liable to be deformed in a convex or concave shape. That is to say, the increased thickness of the intermediate layer results in larger heat generation due to curing of FRP causing temperature rise, whereby the center core is reduced in strength and is liable to be deformed.

In addition to the above heat generation and contraction caused by curing, the following may be taken as other deformation factors. That is, when an uncured intermediate layer composed of reinforcing long fiber impregnated with a liquid-state thermosetting resin goes out of a shaping nozzle, corners of the intermediate layer are less deformed but the sides thereof are expanded in a convex-shape outward because of a repulsive force of the sides of the center core having already been cooled and solidified (the sides of the center core are deformed by the passing-resistance and pressure for squeezing the thermosetting resin upon passage thereof through the shaping nozzle, and the repulsing force is generated because of the release of the applied pressure). The larger the length of one side of a composite pipe, the stronger this tendency becomes. For a composite pipe with the length of one side in a range of about 60 mm or less, such deformation can be eliminated by preparing a shaping nozzle in which the inner surface is curved to form a concave-shape so as to compensate for the deformation.

For a composite pipe with the length of one side being much larger, since the above deformation becomes larger, it becomes difficult to compensate for the deformation. A composite pipe having a circular sectional shape is less susceptible to deformation resulting from the above reasons; however, in such a circular composite pipe with a diameter of a hollow portion being larger, the wall thickness of the intermediate layer is required to be increased over 10 mm to maintain the strength of the pipe, resulting in increased weight. For a composite pipe having a rectangular sectional shape, deformation of the longer-side becomes particularly larger. To be more specific, the larger the ratio of long-side (width)/short-side (height), particularly, this ratio being over 1.5/1, the larger the deformation becomes. Then, it is difficult to compensate for such large deformation by curving the shaping nozzle. In general, it is desired to use, as a scaffold board for construction/civil engineering works, a FRP hollow material having a thickness of about 20 to 60 mm and a width of about 200 to 300 mm in terms of light-weight, high strength, high durability, and high electric insulation. However, since the width thereof is over 60 mm, the above-described deformation becomes larger, to thereby reduce the strength of the material and to deteriorate stability in laminating these materials to each other upon storage and transportation.

When the ratio of long-side/short-side is more than 1.5/1, the compressive strength thereof is also reduced. This is because even slight deformation in the width direction tends to cause longitudinal cracks in a FRP intermediate layer because of stress concentration, and to cause concentrated overload to be particularly applied at a central portion. Such an inconvenience can be improved by also arranging reinforcing long-fibers in the width direction using a glass cloth, glass mat or the like. However, in this case, the rigidity in the longitudinal direction becomes low, and the manufacturing cost become high because of the increased number of manufacturing steps and the increased unit-weight. A composite pipe may be considered having a ladder-like sectional shape in which a plurality of FRP legs for connecting upper and lower FRP planes are arranged in the longitudinal direction in addition to outer peripheral FRP portions arranged on the upper, lower, right and left sides. In this composite pipe, however, if it is manufactured using a curing die, the die structure becomes more complicated and the pultruding resistance becomes significantly larger. In case the composite pipe is formed to have a large square cross-section, the FRP legs can be arranged in a criss-cross structure or a truss structure having a hollow portion formed into a triangular shape in cross-section for improving the strength and the dimensional accuracy and reducing the weight. However, there has not been developed a method for industrially manufacturing such a composite pipe for the same reasons mentioned above.

The present invention has been made by taking into account that there has not been known any method for industrially and efficiently manufacturing a large sized fiber-reinforced composite hollow structure having one side or diameter over 60 mm, with increased strength and dimensional accuracy and reduced weight. Thus the first object of the present invention is to provide a fiber-reinforced composite hollow structure having a three-layer structure, which is capable of keeping the strength and rigidity even when the wall thickness is reduced, to thereby achieve lightweight, resource saving, to make less deformation of the sectional shape, and to provide a method of manufacturing the fiber-reinforced composite hollow structure.

(2) In order to obtain a fiber-reinforced hollow composite structure of the above-described three layer structure, a method of extruding thermoplastic resin to cover an uncured core portion having a center core covered with an intermediate layer of uncured FRP is implemented by: providing a cross head die; introducing the uncured core portion to the cross head die; and extruding the same for covering. One method (the draft type) is characterized by employing a draft die having a discharge port being relatively larger than the outer periphery of an uncured core portion to be covered, wherein the uncured core portion is allowed to pass through a central space of the die head without contact with the discharge port of the die head, and thermoplastic resin is drafted downward to cover the uncured core portion. Another method (the pressure type) is characterized by pre-heating the uncured core portion, bringing it into direct-contact with molten resin in the die head, and closely covering the cured core portion with the resin by pressuring upon extrusion.

The draft type is poor in adhesion between the thermoplastic resin and the uncured core portion, but has a variety of features, for example, to treat the uncured core portion by the same die lip even if the dimension of the uncured core portion is changed somewhat, and to change the covering thickness with the same die lip by varying the clearance of the die discharge port.

On the contrary, the pressure type is good in adhesion between the thermoplastic resin and the uncured core portion, but it has not the variety of features of the draft type. That is to say, if the dimension of the uncured core portion is changed, the same die lip does not allow the changed dimension, and it is necessary to change the die shape upon change in dimension. The same is true for the change in covering thickness.

In the present invention, a covering die of the pressure type cannot be used because the uncured resin is squeezed at a pressure and is cured by heat of the covering resin. To be more specific, for an uncured FRP core portion impregnated with a liquid resin having a low viscosity, such as an unsaturated polyester, and in an uncured state, the uncured resin is squeezed at a pressure which is applied for extrusion of molten resin and is foamed and cured by heat of the covering resin, to thereby deteriorate the surface state (for example, to give rise to lumps, irregularities, breakage of the covering film, and the like). In summary, to cover an uncured FRP core portion impregnated with a liquid resin, a covering die of the pressure type cannot be used and a covering die of the draft type is required.

However, in the case of covering a large-sized uncured core portion having a cross-section with one side or diameter (in cross-section) which is more than 100 mm, there arises a problem that a uniform covering cannot be obtained because of occurrence of unevenness in covering thickness and wrinkling. More specifically, since a large-sized uncured core portion is almost always molded using a manufacturing line installed in such a manner as to extend in the horizontal direction, molten resin tends to be drooped by the effect of gravity, which obstructs uniform covering.

In general, molten resin extruded from an extruder is cooled by ambient air until it covers the uncured core portion. Thus, if the uncured core portion has a large size, it takes a longer time for the uncured core portion to be extrudingly-covered with the resin because the pultruding rate becomes slow. As a result, the resin is excessively cooled and is not sufficiently drafted. This causes wrinkling of the covering layer and cavities between the covering layer and the uncured core portion. For such a large-sized uncured core portion, the covering rate is in a range of 2–3 m/min or less.

Additionally, a difference in cooling rate between two locations causes unevenness of covering thickness therebetween. The reason to such unevenness by cooling is that environmental air is heated by the uncured core portion extruded from the die, and this causes convection. If an uncured core portion of a flat shape is to be covered with resin using a circular draft die, there are differences between the amount of time required for the extruded resin to reach the covering points. This causes unevenness in temperature at the covering points, thereby making it difficult to uniformly cover the uncured core portion.

In addition to the above extrusion-covering method using a cross head die, there is known another method of covering a thermoplastic resin on a large-diameter pipe or a wide plate-like uncured core portion. This is done by extruding the resin into a sheet, and winding this sheet to the uncured core portion by rotating the latter, or instead, previously preparing a roll of this resin sheet, rotating the roll, and winding the resin sheet around the uncured core portion. A further method is known in which a plurality of resin sheets extruded using a plurality of extruders are wound with edges continuously overlapped, to form a cover layer.

These methods are disadvantageous in that it is difficult to ensure a uniform covering thickness because of the presence of seams (overlapped edge portions) of the resin sheet. As a result, it is required to carry out a post-treatment of cutting off, polishing, or hot-pressing the protruding seams. If a resin soluble in a solvent is used, the protruded seams can be removed by wiping them with a cloth impregnated with the solvent. In each case, however, there occurs another problem that marks of such post-treatments are liable to remain.

Accordingly, a second object of the present invention is to provide a hot-extrusion covering method capable of covering a large-sized uncured core portion having one side or diameter (in cross-section) of more than 100 mm with thermoplastic resin, while keeping its surface in a uniform state (with no wrinkling) by using a draft type covering die, and to provide an apparatus therefor.

(3) In molding plastic products by profile extrusion, a water-cooled sliding type sizing method using a sizing nozzle (sizing plate made from a metal having a high thermal conductivity such as brass) has been generally adopted. In particular, a vacuum sizing method using a sizing nozzle inserted in a water bath surrounded by a vacuum atmosphere has been suitably used.

In manufacturing a three-layered composite hollow structure having two or more of center cores between which legs made from FRP are formed, after an uncured resin core portion is covered with a thermoplastic resin (ABS resin) using a covering die (cross head die), the core portion thus covered with the resin is required to be subjected to molding (sizing) for eliminating deviations among the center cores and smoothly finishing the surface. In this case, the above water-cooled sliding type sizing has the following problems.

For a large-sized composite hollow structure having one side (width) of more than 100 mm (peripheral length: 200 mm or more), there may arise an inconvenience that rippling waves-like wrinkles occur on the surface because of the increased sizing resistance. In particular, the sizing resistance tends to be increased in the case of indirect water-cooling sizing in which the sizing device is indirectly cooled by water. Additionally, only a slight change in dimension (outer shape) of a composite hollow structure brought about by change in condition may cause the structure to be stopped in the sizing device. This makes it impossible, in the worst case, to pultrude the composite hollow structure.

In the water-cooled sliding type sizing, if the covering thickness is uneven and/or foreign materials appear on the surface, the sealing-state of water between the composite hollow structure and the sizing device may be broken. This may leading to occurrence of water running, and irregularities may appear on the surface of the uneven portion because the cooling rate of this portion is different from those of the surroundings. Once water running starts, such running is expanded, and finally there arises a problem that water is scattered to the covering die, to make it impossible to continue the molding. For a large-sized composite hollow structure having one side of more than 100 mm, since the manufacturing speed (pultruding speed) becomes naturally slow, it is difficult to prevent water from running to the side of the covering die with viscosity of water caused between the surface of the sizing surface and the composite hollow structure. Such a phenomenon is liable to occur, particularly, at four corners and portions (the leg portions) between the center cores.

If sizing is implemented by making use of evacuation, suction of air and leakage of cooling water occur intermittently. The sizing apparatus has no flexibility to adapt to the varied dimension of a composite hollow structure being subjected to sizing. One set of sizing devices must be basically prepared for one shape (one kind) of a composite hollow structure. That is to say, the set of sizing devices, which are not commonly used for composite hollow structures different in width, thickness and the like, are poor in degree of freedom of usability.

After being covered with resin and subjected to sizing, the uncured resin core portion is required to be cured. For a composite pipe having a three-layer structure, there is preferably adopted, in terms of reliability, economical efficiency and safety, a method of curing the uncured resin core portion using hot water at about 100° C. The shape of the uncured composite hollow structure having a three-layer structure is held by a thermoplastic resin covering layer (preferably made from a styrene based resin such as an ABS resin in terms of physical property and cost) formed on the outer periphery. However, as the temperature of the resin becomes high, the shape retention characteristic thereof becomes low (the thermal deformation temperature of the general ABS resin is about 90° C. or less), causing the tendency that the sectional shape of the composite hollow structure is changed. Since the composite hollow structure is cured in hot water, the structure, particularly, having a large-size is applied with large buoyancy, and thereby it is liable to be deformed (warped) in the longitudinal direction. As a result, a means is needed to support the shape of a composite hollow structure from the outer side until the uncured core portion is cured. To prevent the floating of a composite hollow structure due to buoyancy, pressure rollers only for pressing down the composite hollow structure have been disposed in such a manner as to be spaced from each other at equal intervals (1.0 to 1.5 m). In this way, the warping in the longitudinal direction is reduced. However, warping may occur in the width direction (deformation of the sectional shape, which projects downward or is recessed upward).

Accordingly, a third object of the present invention is to provide a method capable of improving the surface smoothness, the accuracy of sectional shape, and adhesiveness of FRP/outer layer of a large-sized fiber-reinforced composite hollow structure having one side or diameter of more than 100 mm, and also capable of improving productivity of a composite hollow structure, and to provide an apparatus therefor.

(4) The fiber-reinforced composite hollow structure of the present invention is used not only as a scaffold board for construction works or civil engineering works, but also as a temporary scaffold board for electric work, painting work or the like, a walk board for culturing, or a permanent standing board for a circuit way, a promenade or overpath.

When used outdoors as a temporary scaffold board or the like, the fiber-reinforced composite hollow structure of the present invention often gets wet from rain. In this case, the composite hollow structure of a three-layer structure including a center core made from thermoplastic resin, an intermediate layer made from FRP, and an outer cover layer made from thermoplastic resin exhibits an inconvenience that the smooth outer cover layer becomes slippery when it gets wet. Also, in case a powder-like material, such as sand or other such material, adheres to the covering layer, it tends to get slippery.

Accordingly, a fourth object of the present invention is to provide a fiber-reinforced composite hollow structure which is less slippery than a conventional one even if it gets wet or particles such as sands adheres thereto, and which is suitably used as a scaffold board for various works.

(5) When used as a scaffold board for various works, a fiber-reinforced composite hollow structure may possibly fall or collide into a wall or the ground during transportation, or comes in contact with other scaffold boards in use, so that the impact force applied to the structure may cause cracks in the FRP-made intermediate layer of the structure at its end portion. The progress of these cracks leads to longitudinal cracks in the intermediate layer and reduction in strength and rigidity of the structure, thereby making, in the worst case, it impossible to the continue use of the structure. On the other hand, provision of a metal-made protective member on the end portion of a composite hollow structure cause a problem in terms of electric insulation and corrosion resistance. To cope with such a problem, it may be considered to form the end portion of the structure by insert-molding of thermoplastic resin or thermosetting resin. However, since a composite hollow structure of the present invention is generally long in length and has a continuous hollow portion, insert-molding of resin cannot be applied.

It may be considered to fit a resin-made cap in a hollow portion of a center portion. It is preferred to fix such a cap in the hollow portion of the center core using an adhesive. However, in this case, permeation of water into the hollow portion cannot be fully prevented because the adhesive cannot be fully applied around the portion of the cap to be fitted to the hollow portion, and even if the adhesive is fully applied, there is a possibility of partial leakage of water after a long-term use. In the case of using a hermetic-type cap, if water is accumulated in the hollow portion of the center core, it cannot be easily removed, which may degrade the electric characteristics and safety of the structure. For this reason, it is preferred to provide drain holes in the cap. If the composite hollow structure of the present invention is used as a scaffold board, since the scaffold board is designed with its function kept constant if the board is turned over, the drain holes must be designed to maintain their function even if the board is turned over.

If the cap is a type which is mounted to each hollow portion of the composite hollow structure, and if the structure has, for example, seven pieces of the hollow portions, 14 pieces of the caps must be mounted on both ends of the hollow portions. This will certainly complicate the mounting work of the caps. Further, if there are differences and/or inclinations among the hollow portions, the adjacent caps may be in contact with each other, thus making it, in the worst case, impossible to mount the caps. Even in the case of using an integral-type cap structure in which seven pieces of projections as plugs are integrally juxtaposed, there is a fear that the projections cannot be inserted into the hollow portions unless they exhibit a deformation function. If the caps are not deformable and if the projections are designed to be small in consideration of dimensional tolerances of the composite hollow structure, there is a fear that the projections will float and will not be brought into contact with the walls of the hollow portions of the composite hollow structure. In this case, there is a fear that the projections tend to fall off from the hollow portions. Even if the number of the projections is reduced, and only three projections are provided correspondingly to the right, left and central hollow portions, the above problem cannot be solved. Additionally, in a configuration in which the projections are not fitted in the hollow portions but a cap is disposed to surround the hollow portions as a whole, the thickness and width of the cap become larger and a step portion will be formed. As a result, the cap is possibly loosened upon transportation because the composite hollow structure will get caught to each another. Also, the composite hollow structures are usually stacked upon transportation or storage, but the workability will become poor, and the stacks will tilt and consequently collapse because of the presence of the step portions.

Accordingly, a fifth object of the present invention is to provide a fiber-reinforced composite hollow structure provided with a thermoplastic resin-made cap which allows water having been accumulated in a hollow portion of a center core to be easily removed therefrom, and which is easily fitted in the hollow portion and less removed therefrom, so as to eliminate occurrence of cracks in a FRP-made intermediate layer even if the structure falls or collides into a wall, the ground, and other composite structures, to thereby suppressing occurrence of longitudinal cracks in the intermediate layer to bring about improved longevity.

BRIEF DESCRIPTION OF DRAWINGS

FIGS. 2(a), 2(b) and 2(c) are front views each showing configurations of both a dispersion guide and a squeezing nozzle used in Example 1;

FIG. 3 is a side view of a fiber-reinforced composite hollow structure finally obtained in Example 1;

FIGS. 4(a) and 4(b) are front views each showing configurations of a dispersion guide and a squeezing nozzle in Example 3;

FIGS. 5(a), 5(b) and 5(c) are front views each showing configurations of a dispersion guide and a squeezing nozzle in Example 9;

FIGS. 16(a) to 16(f) are front views each showing configurations of a dispersion guide and a squeezing nozzle in Example 13;

FIG. 20(a) is a front view showing a jacket nozzle according to one embodiment of the third invention and FIG. 20(b) is a sectional view taken on line A—A of FIG. 20(a);

FIGS. 21(a) and 21(b) are a side view and a front view of the manufacturing apparatus according to one embodiment of the third invention;

FIGS. 23(a) and 23(b) are a plan view and a side view of a roller-sizing device in curing tank, respectively;

FIGS. 24(a) and 24(b) are a plan view and a side view of a sliding type sizing water bath, respectively;

FIGS. 26(a) to 26(c) are a front view, a side view and a rear view of a cap according to a sixth invention; and FIG. 26(d) is an enlarged sectional view of FIG. 26(a).

Figure 1:
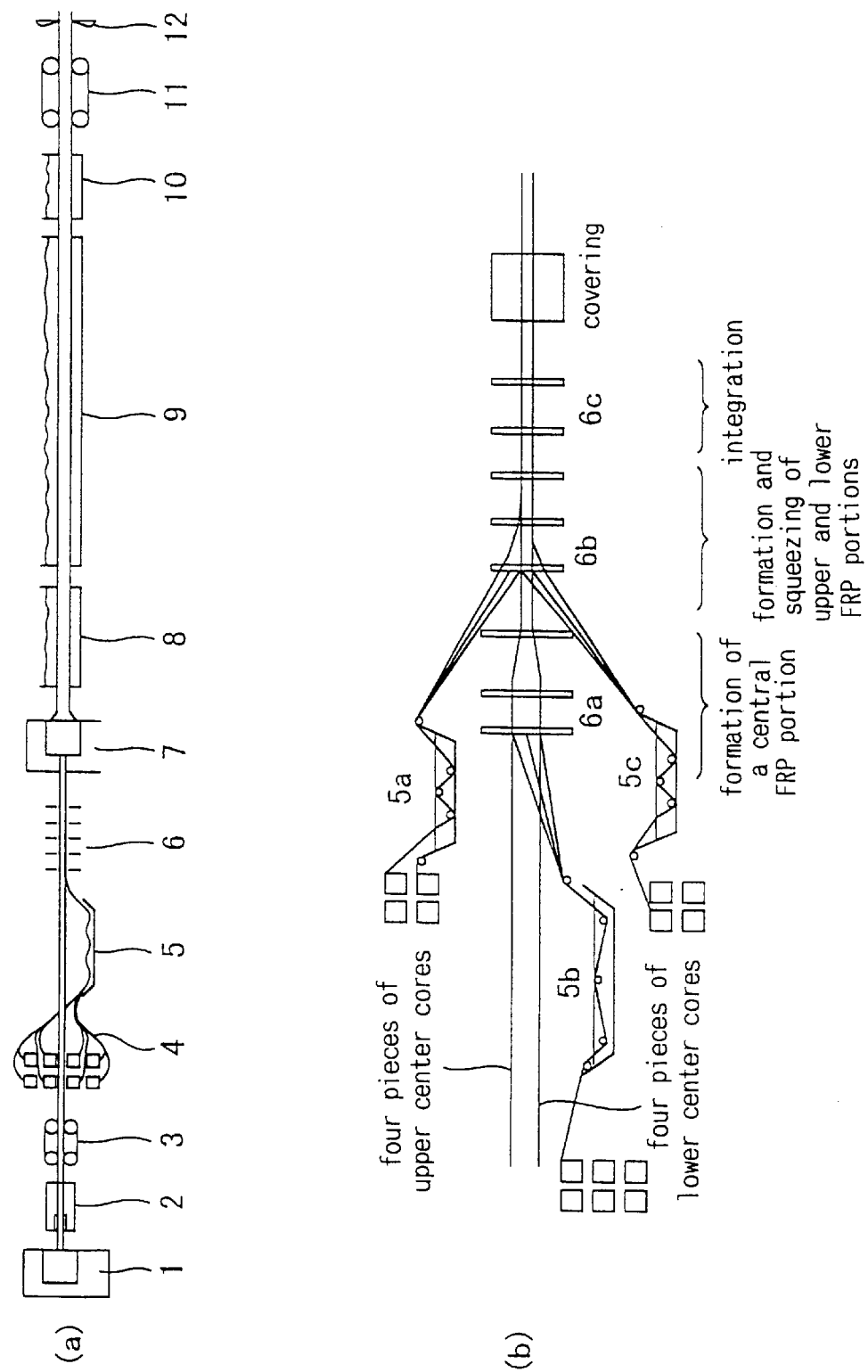
FIGS. 1(a) and 1(b) are schematic views showing an apparatus for manufacturing a fiber-reinforced composite hollow structure according to a first invention.

SUMMARY OF INVENTION (1) According to the invention described in claim 1, there is provided a fiber-reinforced composite hollow structure, characterized in that a plurality of hollow center cores (inner tubular layers) made from a thermoplastic resin, each of which is formed into an arbitrary shape such as a polygonal or circular shape in cross-section, are juxtaposed to each other in the horizontal, vertical or oblique direction; said plurality of center cores are joined into one body by an intermediate layer formed of reinforcing long-fibers integrally bonded to each other with a thermosetting resin whereby a leg portion, made from reinforcing long-fibers integrally bonded to each other with a thermosetting resin, is formed between each of said adjacent center cores; and the outer periphery of said intermediate layer is integrally covered with an outer layer made from a thermoplastic resin.

According to the present invention, part of the intermediate layer made from the thermosetting resin is formed in the spaces located between the adjacent ones of the plurality of center cores, to form legs. As a result, even if the structure is formed in a rectangular cross-section with a width/height ratio of 1.5/1 or more, or, even if the wall thickness is made thin, or a load is concentrated at a central portion, the structure exhibits a high strength and a high rigidity and is less deformed. Further, since the wall thickness can be made thin, the manufacturing cost can be reduced. Also, since the reinforcing fibers in the intermediate layer are covered with the thermoplastic resin-made outer layer, they do not float out to the exterior, so that the appearance of the pipe-shaped product is enhanced.

Further, according to the present invention, the shape and number of the center cores are suitably determined depending on the required performance and the application (in the examples to be described later, two pieces of the center cores will be illustrated; however, a wide composite hollow structure including six or seven pieces of the center cores can be provided). Here, the term "arbitrary shape" appearing in claim 1 includes polygonal shapes such as a square, rectangular, trapezoidal, parallelogram, triangular, or hexagonal shapes; and also includes a complete circle or ellipse, or an arcuate or fan shape.

In the present invention, the center cores may be juxtaposed to each other in such a manner as to be in contact with each other, or spaced from each other.

(2) According to an invention described in claim 2, a hollow portion of said center core is divided into parts by a leg made from a thermoplastic resin. With this configuration of this invention, it is possible to further reduce the deformation of the fiber-reinforced composite hollow structure.

(3) According to an invention described in claim 3, the thermoplastic resin which forms said center core is adhesive to said intermediate layer, and also has a thermal deformation temperature of 100° C. or more.

With this configuration of this invention, since the thermal deformation temperature of the thermoplastic resin for forming the center core is 100° C. or more, the center core is less softened and deformed, even if the curing temperature is high.

(4) According to an invention described in claim 4, the wall thickness of said intermediate layer is 0.5 to 3 times the wall thickness of said center core, or 0.5 to 3 times the wall thickness of said outer layer. With this configuration of this invention, one side of the unit being mainly composed of the center core is 60 mm or less, even for a large-sized fiber-reinforced composite hollow structure, for example, having one side of 60 mm. Thus, it is possible to suppress the deformation of the structure and keep the strength thereof. Further, even if the thickness of the intermediate layer is made thin, for example, 0.5 to 3 times the thickness of the outer layer, it is possible to keep the strength of the structure.

The thickness of the intermediate layer may be arbitrarily selected in consideration of the entire dimension of the fiber-reinforced composite hollow structure, but it is preferably set at a value of about 0.5 to 4 mm. When the thickness of the intermediate layer is thinner than that of the outer layer: the strength of the structure cannot be kept; the structure is liable to be affected by the dimensional tolerance of the center core; or molding cannot be stably performed since resistance upon shaping (squeezing-molding) becomes large. When the thickness of the intermediate layer is 4 times or more than the thickness of the outer layer, there occur inconveniences that: the improvement in strength and rigidity is reduced; the accuracy in shape is reduced because contraction and heat generation due to curing become larger; and the weight is increased.

As for the hollow portion of the center core, one side (long side or short side) or diameter (major axis or minor axis) is preferably in a range of 2 to 50 mm. If it is less than 2 mm: the shape is complicated; the weight reducing effect is reduced; and the cost is raised. If it is more than 50 mm, the hollow portion becomes excessively large, and thereby the deformation becomes larger and the strength is reduced.

The thickness of the center core may be in a range of 0.7 mm (preferably 1 mm) to 2 mm (preferably, 1.5 mm), and is made substantially equal as a whole. If it is less than 0.7 mm, the rigidity is insufficient, leading to deformation. If it is more than 2 mm, the weight is increased and also the cost is raised. If the thickness of the center core differs at different portions, there is a possibility of deformation upon molding.

(5) According to an invention described in claim 5, the thermoplastic resin for forming each of said center core and said outer layer is selected from styrene based resins such as PS resin, AS resin, AES resin, AAS resin and ABS resin, and the thermosetting resin for forming said intermediate layer is an unsaturated polyester or a vinyl ester resin containing a styrene monomer as a crosslinking component.

To firmly bond the center core, intermediate layer, and outer layer to each other, it is desired to select materials which are mutually compatible. As the thermosetting resin (matrix resin) for forming the intermediate layer, there is preferably used a styrene based unsaturated polyester resin, since the balance in cost and physical properties is good. As the thermoplastic resin for forming each of the center core and the outer layer, there may be used: a styrene resin such as PS, AS, AES, AAS, or ABS resin; a styrene modified PPE, PMMA, or PC resin, or a mixture thereof; or an alloy resin of a thermoplastic resin (PBT, PA or PP) alloyed with the above resin. In particular, the thermoplastic resin described in claim 5 is preferably used because it is good in adhesiveness with a styrene-based unsaturated polyester resin to improve the strength of the final composite hollow structure, and also, the balance in cost and physical property is good.

(6) According to an invention described in claim 6, a portion of said intermediate layer positioned at each corner of said center core is thicker than the rest of said intermediate layer. With this configuration of this invention, it is possible to improve mechanical strengths, such as compressive strength, bending failure strength, and bending rigidity, of the intermediate layer, and to prevent occurrence of deformation (depression) of the peripheral portion of the intermediate layer.

(7) According to an invention described in claim 7, the surface of said outer layer is provided with an antislipping function by a surface-treatment of imparting irregularities onto the surface of said outer layer.

By thus imparting irregularities onto the surface of the outer cover layer made from a thermoplastic resin, there can be obtained a composite hollow structure having an antislipping function. The irregularities may be imparted by the following methods of: (1) mechanically coarsening the surface, for example, by sand-blasting; (2) heating the thermoplastic resin cover layer and imparting irregularities on the surface thereof using an embossing roller; (3) extruding the thermoplastic resin through a die mouth provided with a pattern of irregularities (projecting streaks) while covering the composite structure with the thermoplastic resin; and (4) imparting irregularities by combination of the above methods. By use of either of the methods, it is possible to obtain a sufficient antislipping effect.

(8) According to an invention described in claim 8, a protective cap made from thermoplastic resin is fitted to the end portion of said center core. This cap comprises a plate-like portion of a planar shape having substantially the same shape as the cross-section of the end portion of said composite hollow structure, and a claw-like projecting portion which projects from said plate-like portion and which is expanded towards the tip ends thereof, said projecting portion being divided into parts in the peripheral direction. The cap is preferably formed of a material of the same kind as that of the material used for forming the center core or outer layer (i.e., a high impact resisting styrene resin such as an ABS resin) which exhibits a sufficient adhesiveness when bonded with an adhesive. The cap has: a plate-like portion of a planar shape having substantially the same shape as the cross-section of the end portion of the composite hollow structure; pairs of claw-like projections projecting from said plate-like portion, each pair being fit to the upper and lower surfaces of each hollow portion of each center core; and a pair of claw-like projections to be fitted to the side surfaces of the end portion of the hollow portions located at both ends of the composite hollow structure. The wall thickness of the plate-like portion is required to be in a range of about 5 to 10 mm. When it is 5 mm or less, the strength is too small to absorb impact; while when it is 10 mm or more, the effect is saturated and the economical efficiency is made poor.

The pair of claw-like projections to be fitted to each hollow portion is formed such that a gap therebetween becomes larger toward their tip ends. Each of the tip ends is chamfered at an acute angle. The width (height) formed between the pair of surfaces of the chamfered tip end is smaller than the dimension (height) of each hollow portion, and the outer width of the pair of claw-like projections is larger than the dimension (height) of each hollow portion. In this way, the claws are certainly inserted in each hollow portion and certainly in pressing-contact with the wall of the composite hollow structure by the spring-effect and the adhesiveness of the adhesive. The width of the claw-like projections is preferably in the range of 1/2 to less than 1/1 of the width of the straight portion of the center core.

In the example to be described later, the above width is set at 20 mm, which is about 5 mm shorter than the straight portion of the hollow portion. The length of the projection may be in a range of 10 to 30 mm. When it is more than 30 mm, the economical efficiency will become poor, and also, such a longer projection is difficult to be inserted in the hollow portion. When it is less than 10 mm, such a shorter projection is easy to fall out from the hollow portion.

Further, it is preferred to form drain holes in the pair of the claw-like projections at positions near the upper and lower surfaces of each hollow portion. The drain holes may be respectively provided on the upper and lower sides, or a long slot may be provided in place of the two drain holes.

The cap can be adhesively bonded with a synthetic resin made adhesive containing a solvent such as toluene, MEK or the like. This is effective to simply and certainly prevent loosening of the cap.

(9) According to an invention described in claim 9, there is provided a method of manufacturing a fiber-reinforced composite hollow structure, including the steps of: forming a plurality of hollow center cores made from a thermoplastic resin by continuously extrusion-molding the thermoplastic resin, or, continuously supplying a plurality of hollow center cores made from a thermoplastic resin which have been already formed by extrusion-molding the thermoplastic resin; preparing a plurality of reinforcing long-fiber bundles, each of which is impregnated with thermosetting resin; squeezing-molding the plurality of reinforcing long-fiber bundles in such a manner that the long-fiber bundles are arranged around the outer peripheries of the center cores and in between each of the adjacent center cores, form an intermediate layer and a leg portion; integrally covering the outer peripheries of the thus-covered center cores with thermoplastic resin to form an outer layer; cooling the resultant composite; and heating and curing the thermosetting resin of the intermediate layer.

With this invention, an intermediate layer made from a thermosetting resin is formed between respective adjacent ones of a plurality of the center cores, as legs. As a result, it is easy to mold a fiber-reinforced composite hollow structure of a three-layer structure having a high strength and a high rigidity and being less deformed even when a load is concentrated at the central portion.

(10) According to an invention described in claim 10, there is provided a method of manufacturing a fiber-reinforced composite hollow structure, including the steps of: forming a plurality of hollow center cores made from a thermoplastic resin by continuously extrusion-molding the thermoplastic resin, or, continuously supplying a plurality of hollow center cores made from a thermoplastic resin which have been already formed by extrusion-molding, in such a manner that the center cores are juxtaposed to each other in the horizontal, vertical or oblique direction; preparing a plurality of reinforcing long-fiber bundles, each of which is impregnated with thermosetting resin; squeezing-molding each reinforcing long-fiber bundle in such a manner that the long-fiber bundles are arranged around the outer peripheries of the center cores and in the spaces between the adjacent center cores to form an intermediate layer and a leg portion; integrally covering the outer peripheries of the center cores having been covered with the intermediate layer with a thermoplastic resin to form an outer layer; cooling the resultant composite; and heating and curing the thermosetting resin of the intermediate layer.

With this invention, since the number of the fiber bundles arranged in each leg can be reduced, the space between the adjacent center cores can be reduced. Also, since a squeezing-molding nozzle which is longer in the arrangement direction can be adopted, the composite hollow structure can be molded with its outer contour kept smooth.

(11) According to an invention described in claim 11, the intermediate layer is heated and cured at a temperature close to or less than the thermal deformation temperature of the thermoplastic resin of the center cores.

The curing temperature of thermosetting resin for forming the intermediate layer is set to be equal to or less than the thermal deformation temperature of a thermoplastic resin for forming the center core. The thermosetting resin such as an unsaturated polyester resin is preferably cured using a curing agent composed of BPO-based peroxide or other similar agents. The curing of the thermosetting resin is preferably performed in hot water at a temperature in a range of 85 to 100° C.

(12) According to an invention described in claim 12, in the step of squeezing-molding each of the plurality of reinforcing long-fiber bundles impregnated with the thermosetting resin, the squeezing ratio of the long-fiber bundles positioned at the legs, each of which are positioned between two adjacent ones of the plurality of center cores, is set to be higher than that of the rest of the long-fiber bundles, in order to set the content of the glass fibers (glass content: hereinafter, referred to simply as "GC") in each of the legs at a higher value.

With this invention, since the resin is previously squeezed before the final squeezing-molding stage such that the glass content (GC) of the legs comes to a value close to the final GC, it is possible to suppress deformation at the time of the final squeezing-molding. At the final squeezing-molding stage, only the fiber bundles located at the outer periphery are more squeezingly-molded, and the fiber bundles located at the legs are less squeezingly-molded. However, according to the present invention, it is possible to equalize the final GC as a whole. Here, in the case where the squeezing ratio of portions other than the legs is set at a value in a range of 90 to 95% of the final GC, the GC of the legs is set at a value in a range of 95 to 100% of the final GC.

Further, even in the case where the inner surface of the squeezing die having a rectangular or triangular shape is not recessed in consideration of deformation, it is possible to obtain a composite hollow structure with each side having an approximately straight cross section.

(13) According to an invention described in claim 13, the hollow center cores are juxtaposed to each other in the horizontal, vertical or oblique direction in such a manner that each center core extends along a parabolic line in the pultruding direction of the center core. With this invention, it is possible to carry out the continuous pultruding action extremely smoothly. To manufacture a composite hollow portion at a high efficiency and without enlarging each gap between adjacent center cores, it is preferred to supply the center cores along a line before integration, and to gradually shift the moving locus of the center cores into a quadric curve directly before integration. This is effective to carry out the continuous pultruding action extremely smoothly.

(14) According to an invention described in claim 14, there is provided a method of manufacturing a fiber-reinforced composite hollow structure, in which thermoplastic resin is hot-extruded at a suitable position between the discharge port of a cross head die of a draft-type and the covering point, to cover the outer periphery of an uncured core portion composed of the center cores and an uncured FRP intermediate layer which are equivalent to those of the fiber-reinforced composite hollow structure described in claim 1, characterized by melting and extruding the thermoplastic resin used for covering, and immediately heating the thermoplastic resin by a heater; sealing the uncured core portion located in the cross head die with a suitable sealing means; and covering the uncured core portion with the heated thermoplastic resin inside or outside the heater while performing evacuation from the lower portion of a space substantially enclosed by the pultruded uncured core portion and the thermoplastic resin discharged from the die and also giving a draft thereto.

With this invention, by the sealing effect of the sealing means in combination with the effect of giving a draft to the thermoplastic resin under evacuation from a lower portion of a space substantially enclosed by the pultruded uncured core portion and the thermoplastic resin discharged from the die, it is possible to prevent the droop of the lower covering resin due to gravity, and hence to uniformly cover even a large-sized uncured core portion, having a width of 200 mm or more and thickness of about 30 mm, with the resin while keeping a desirable surface state without wrinkles.

Since the glass fibers impregnated with the uncured resin is in contact with the covering resin in a molten state, the adhesiveness of the interface between the FRP portion and the covering resin can be improved. Also, the same covering die can be used even if the dimension of the core portion is changed.

By heating the thermoplastic resin with a heater directly after being melted/extruded, it is possible to defer lowering of temperature of the covering resin caused by exposure to outside air, and hence to complete the covering in a state in which the adhesiveness of the covering resin is not lost. Even if the covering point is out of the heater, such a heating effect can be exhibited, to improve the adhesiveness of the covering resin as compared with the case without use of the heater.

As described above, the covering of the uncured core portion with a thermoplastic resin prevents the uncured core portion after having been cured from being damaged, imparts a heat-insulating property thereto, and improves the corrosion resistance thereof. The covering resin feels soft, and when subjected to moire finishing, it improves decorativeness of the composite hollow structure. Also, the covering resin layer can exhibit the above-described antislipping effect by irregularities imparted onto the surface thereof.

Further, according to this invention, by use of a draft type cross-head having a circular or elliptic discharge port, it is possible to cope with slight dimensional change of the uncured core portion, and to change the covering thickness.

(15) The invention described in claim 15 is characterized by allowing the outer layer in a softened state to pass through at least one pair of upper and lower sizing rollers to thereby implement sizing of the outer layer, after covering the outer periphery of the intermediate layer with the outer layer as described in claim 9 or 10. Each of the sizing rollers has a high heat resistance and is rotatable.

With this invention, there is obtained a fiber-reinforced composite hollow structure which has no wrinkles, has smooth surfaces both in the width direction and the longitudinal directions, has a glossy surface, has enhanced accuracy in shape, and is improved in adhesiveness between the covering resin and the intermediate layer.

(16) According to an invention described in claim 16, there is provided an apparatus for manufacturing a fiber-reinforced composite hollow structure, used for hot-extruding a thermoplastic resin to cover an uncured core portion composed of the center cores and an uncured FRP intermediate layer which are equivalent to those of the fiber-reinforced composite hollow structure described in claim 1, the apparatus including; a cross head die of a draft type; a heater disposed at a suitable position between the discharge port of said cross head die and the covering point in such a manner as to surround the uncured core portion; a sealing means for sealing the uncured core portion located in said cross head die; and a covering means for covering the uncured core portion with the thermoplastic resin inside or outside said heater while performing evacuation from the lower portion of a space substantially enclosed by the pultruded uncured core portion and the molten thermoplastic resin discharged from said die and also giving a draft to the thermoplastic resin; wherein the thermoplastic resin is heated by said heater directly after the thermoplastic resin used for covering is hot-extruded.

By use of the apparatus of this invention, the uncured core portion can be uniformly covered with a thermoplastic resin without particularly changing the conventional apparatus.

(17) According to an invention described in claim 17, there is provided an apparatus for manufacturing a fiber-reinforced composite hollow structure described in claim 1, characterized in that a plurality of pairs of rotatable and heat-resisting sizing rollers, each pair being disposed at least on the upper and lower sides, are disposed in the pultruding direction for sizing the softened outer layer covered on the outer periphery of the intermediate layer, whereby said plurality of pairs of the sizing rollers are cooled gradually in the order from those positioned on the upstream side to those positioned on the downstream side.

The sizing rollers may be a multi-stage rollers in which rotatable metal rollers with a diameter of about 40 to 50 mm are arranged at equal intervals of about 100 mm, and preferably, seven or eight pairs or more of the rollers are arranged in the vertical direction and the substantially equal pairs of the rollers are arranged on the lateral direction (on both sides). The number of the sizing rollers must be at least four pairs or more. The sizing starts after the covering resin supplied at the covering point is fully placed on the uncured core portion. The rollers are not located only on the upper side or alternately, but on both the upper and lower sides in pairs to hold a composite hollow structure therebetween.

The length of the manufacturing apparatus of this invention, while it is dependent on the manufacturing speed, requires at least 400 mm. For example, the length of the manufacturing apparatus may be set at about 700 mm and the effective width may be set at 300 mm.

In the case of using a heater for heating a covering resin, part (two or three pairs) of the sizing rollers is disposed in the heater, and sizing must be performed at a location not too separated from the covering point. (That is, in a state in which the covering resin is softened.) If it is separated, the sizing effect is eliminated because the covering resin is cooled by the uncured core portion.

The frame is of a structure which is movable in the longitudinal direction with a handle and is stopped by a stopper, and preferably, it is suitably provided with a centering (positional adjustment) function in the lateral direction and the vertical direction, if necessary.

To prevent the temperature rise due to heat of a covering resin, the rollers are required to be provided with a cooling mechanism. The temperature rise causes the covering resin to easily adhere on the rollers, leading to a failure, and further obstructs the cooling effect. The cooling means provided for the front stage rollers may differ from that provided for the rear stage rollers (front stage: using oil, hot water or hot air; rear stage: using cooling water). That is to say, the cooling at the front stage is performed in such a manner as to gradually cool the covering resin. This is effective to relax rapid solidification and contraction of the covering resin by rapid cooling, and hence to improve the adhesiveness between the covering resin and the FRP layer. Further, while the molten covering resin is liable to adhere on the rollers on the upstream side (front stage), such an adhering phenomenon can be prevented by cooling the rollers. The adhesion of the covering resin on the rollers causes wrinkles and irregularities on the surface of the covering layer, and also weakens the adhesiveness between the covering resin and the FRP layer. In the case of using the heater for heating the covering resin, particularly, the rollers disposed in the heater must be cooled. For this purpose, the heater may be of a structure with one side surface partially cutaway.

To ensure the releasability between the covering resin and the rollers, some of the front stage rollers on the upper and lower sides may be connected to each other via upper and lower belts respectively, whereby the covering resin is pressed between these belts before the covering resin is cooled and solidified. The belt is preferably coated with a material with a high releasability (for example, a Teflon-impregnated glass cloth). This allows a pattern formed on the surface of the belt to be transferred on the surface of the covering resin. In case only rollers are used, at least the front stage rollers (Nos. 1, 2, and 3 rollers at the first-stage rollers) are preferably covered with a material with a high releasability such as Teflon, to improve the releasability from the covering resin. The treatment with a material having a high releasability includes: winding a tape of fluororesin; coating of fluororesin; or coating of ceramic such as titanium nitride (TiN), tungsten carbide (WC) or titanium carbide (TiC).

The use of the roller having an embossing pattern on its surface is preferred because it can directly transfer such a pattern on the surface of the covering resin. However, a deep embossing pattern in which the depth of the recess is, for example, over a half of the covering thickness, is undesirable because it possibly causes breakage of the covering layer.

The setting of the rollers for sizing is based on a roller-clearance-controlling manner in which each gap between adjacent rollers is adjusted and then fixed in position. The roller clearance for the front stage rollers is preferably differed from that for the rear stage rollers. That is to say, the roller clearance for the front stage rollers is set to be slightly wider than that for the rear stage rollers so as to reduce the effect of high temperature heat caused by the molten covering resin exerted on the uncured core portion. This is effective to improve the adhesiveness between the covering resin and the FRP layer. The roller clearance for the rear stage rollers is set at a value equal to an average thickness of the member to be sized (that is, average thickness of a product). It is difficult to uniformly press the upper and lower rollers by the method of setting the rollers by adjusting pressure (contact pressure), and also it causes an inconvenience that the rollers are liable to be tilted. This could result in that: adhesiveness between the covering resin and the FRP layer is reduced; unevenness in thickness easily occurs on the upper and lower surfaces; or the accuracy in shape is reduced.

As a safety equipment, there may be provided a mechanism which opens each gap between adjacent rollers or stops the pultruding machine when an excessive force is applied to the sizing apparatus. The gap between the rollers is set to be adjusted in a range of about twice the thickness of a product or less (30.0 to 60.0 mm) by provision of stoppers. The rollers may be designed to escape if an excessively thick portion occurs.

The rollers may be rotated independently or in synchronization with rotation of the pultruding machine. If rotation of the rollers is stopped, the uncured core portion is squeezed, and stays near the rollers to be cured, degrading smoothness of the surface of the covering resin or causing trouble. In consideration of workability, it is desired that upon initial pultruding, each gap between adjacent rollers is largely opened (50 mm or more) and the rollers are kept stopped.

(18) The present invention includes not only the inventions described in the above-described claims but also inventions obtained by suitable combination of requirements described in the above-described claims. For example, an invention dependent on claim 1 can be newly created by combination of the invention described in claim 2 or 3 with the invention described in claim 1.

BEST MODE FOR CARRYING OUT THE INVENTION

Hereinafter, preferred modes of the present invention will be described in detail with reference to the accompanying drawings.

-First Invention-

<Example 1>

FIG. 1(a) shows an apparatus for continuously manufacturing a fiber-reinforced composite hollow structure according to the present invention. A plurality of pipe materials were simultaneously, continuously extrusion-molded from a PS based thermoplastic resin such as an ABS resin (trade name: Y672B, produced by Ube Cycon, Ltd.) using an extruder 1. These were subjected to inside-diameter sizing using a mandrel or vacuum sizing using an outside diameter sizing bath 2 to be formed into square pipes each having a wall thickness of 1.4 mm, an outer dimension of 26.9×25.4 mm (a unit-weight of 135 g/m). The square pipes thus obtained were taken as center cores. Two pieces of the center cores were juxtaposed and pultruded rightward in the figure by a pultruder 3.

On the other hand, glass rovings 4 (RS-440RR-526, produced by Nitto Boseki Co., Ltd.) as reinforcing long-fibers were allowed to pass through an impregnation bath 5 so as to be impregnated with an unsaturated polyester resin, and then allowed to pass through dispersion guides and a plurality of squeezing nozzles (dies) 6 in sequence so as to be squeezed in such a manner as to be located at specific positions around outer peripheries of the center cores.

FIG. 2(a) shows: guides 20, each being formed into an approximately square shape, for guiding two pieces of the center cores such that the center cores are juxtaposed on the right and left; rectangular nozzles 21 for squeezing glass fiber bundles such that the fiber bundles are arranged facing the side portions of the center cores; and circular nozzles 22 for squeezing the glass fiber bundles such that the fiber bundles are arranged facing the corners of the center cores. Referring to the figure, the nozzles positioned between the two center cores for forming a leg therebetween were arranged in two lines on the right and left. At this time, the GC of those of the glass fibers positioned around the outer periphery of the final molded-product was set at 90 to 95% of a predetermined value, and the GC of those of the glass fibers positioned at the leg between the center cores was set at 95 to 100% of the predetermined value. FIG. (b) of the same Figure shows two nozzles 23, each being formed into an approximately square shape, for integrally joining the glass fiber bundles on the outer peripheries of the center cores.

FIG. (c) of the same Figure shows a nozzle 24, formed into an approximately square shape. The nozzle 24 entirely squeezes the glass fiber bundles into the final squeezing ratio (100%) to integrate the fiber bundles into one unit. As described above, since the squeezing ratio of those of the fiber bundles at the leg is set at a high value before this integration, it is possible to prevent lacking of GC at the leg of the final molded product due to insufficient squeezing of the fiber bundles upon this integration, and hence to equalize the final GCs as a whole.

In addition, the squeezing for the single glass fiber bundle and squeezing for integration with the center cores into one unit is continuously and gradually performed. Accordingly, a gap between the two center cores is not rapidly changed, which results in small molding resistance and deformation, thus enabling continuous molding. Further, the hollow center cores are arranged on the right and left such that the center lines of the center cores depict a parabola (quadratic curve) in respect of the pultruding direction of the center cores (center axis direction). Thus, it is possible to reduce the pultruding resistance and hence to prevent deformation thereof.

The integrated product was then allowed to pass through a final nozzle, being subjected to extrusion by an outer layer extruder 7 such that the ABS resin is circularly extruded, and was cooled and shaped using a sliding type sizing plate (die) 8. The product thus shaped was then allowed to pass through a hot water curing tank 9 or the like, to harden the uncured resin to thereby form the intermediate layer. The unsaturated polyester resin is preferably cured using a peroxide-based curing agent, for example, a BPO based curing agent.

The cured product was then allowed to pass through a cooling water bath 10, being pultruded by a pultruder 11, and was finally cut into a specific length by a cutter 12, to thus obtain the composite hollow structure.

As shown in FIG. 3, the fiber-reinforced composite hollow structure finally obtained is of a three-layer structure having center cores 100, an intermediate layer 200, and an outer layer 300, and is formed as a whole into a rectangular shape having a width of 60 mm and a height of 30 mm. The wall thickness of the outer layer is 1 mm, and a unit weight of the structure is 1080 g/m. Portions of the intermediate layer 200 positioned at corners of the center cores 100 are thicker than the remaining portions of the intermediate layer 200.

The bending rigidity and bending strength of the structure were measured by a three-point bending test at a span of 1000 mm using an Autograph IS-2000, produced by Shimadzu Corporation. In this test, the bending rigidity was calculated on the basis of the following equation:

$$\text{Bending Rigidity } EI=(W\times L^3)/(48\times\delta)$$

wherein W is the load, L is the span, and $\delta$ is the deflection. As a result of the above test, the bending rigidity was $1.94\times10^8$ kg*mm², and the bending strength was 650 kg. In addition, the cross head speed was set at a value of 20 mm/min.

The structure was also subjected to a flat plate type compression test, with a sample length of 50 mm, using a universal tester TCM-5000C, produced by Minebea Corporation. In this test, the compressive strengths in the width (60 mm) direction and in the height (30 mm) direction were measured. As a result of the test, the compressive strength in the width (60 mm) direction was 1510 kg.

For the two center cores, the internal dimension of the central portion and the corner portion in both the longitudinal direction and the lateral direction was measured. As a result, the maximum difference in internal dimension was 0.25 mm in the longitudinal direction and was 0.2 mm in the lateral direction.

In the present invention, the cross-sectional shape of the center core may be changed into a rectangular shape such as a triangular shape or a circular shape; and the center cores may be disposed not only to the right and left sides, but also the upper and lower sides, or both the right and left and upper and lower sides. In the case where the center cores are integrally disposed on the right and left and upper and lower sides, that is, in a cross-shape, it is preferred to squeeze the upper and lower surfaces and the legs (the sides and central crossing portion) of the final composite hollow structure separately from the center cores.

<Example 2>

The dimensions of a final composite hollow structure in this example were set such that the outer dimension thereof was set at the same value as that in Example 1, that is, 60 mm×30 mm; the wall thickness of the outer layer was set at 1 mm; and the wall thickness of the intermediate layer was set at 2 mm (the wall thickness of a leg was also set at 2 mm). The outer dimension of a center core was set at 25.9 mm×24.0 mm; and the wall thickness thereof was set at 1.4 mm.

A fiber-reinforced composite hollow structure being reduced in weight and good in rigidity, dimensional accuracy and strength was obtained, although the wall thickness of the leg between the center cores was slightly thicker, alike Example 1.

<Example 3>

In this example, the dimensions of a composite hollow structure were set such that the outer dimension of the structure was set at 60 mm×30 mm, like Examples 1 and 2, but the wall thickness of the outer layer was set at 0.7 mm and the wall thickness of the intermediate layer (at both the outer periphery and the leg) was set at 1.3 mm. The outer dimension of the center core was set at 27.4 mm×26.0 mm and the wall thickness thereof was set at 1.4 mm. The wall thickness of a glass fiber layer impregnated with unsaturated polyester resin in an uncured state, which layer is disposed so as to surround the center cores, is desired to be uniform at any portion for equalizing the pressure upon squeezing-molding and hence to prevent deformation. However, in Examples 1 and 2, the wall thickness of a portion of the intermediate layer at the leg between the center cores is larger than that of portions at both ends. To equalize the wall thickness at the leg and the end, the wall thickness of the intermediate layer at the central leg portion is required to be smaller than that of the outer periphery. However, if so, the wall thickness of the intermediate layer at the leg is made thin, which increases the squeezing pressure applied to the leg, leading to unbalanced pressure, with a result that there may occur a variation in position of the center core.

Thus, in the present example shown in FIG. 4(a), in a state in which two center cores were juxtaposed right and left, glass fiber bundles impregnated with unsaturated polyester resin were squeezed such that the fiber bundles were disposed around the outer periphery of the final molded-product and at the leg between the center cores, followed by squeezing of the whole for integration, as shown in FIG. 4(b). In this case, at the step shown in FIG. (a), by setting the GC of the glass fiber bundle at the outer periphery at 90 to 95% of a predetermined value and also setting the GC of the glass fiber bundle at the leg at 95 to 100% of the predetermined value, it is possible to prevent deformation upon integration. In addition, as shown in the same Figure, each of the squeezing nozzles positioned on the upper and lower sides from the final composite hollow structure is formed into a rectangular shape extending in the arrangement direction of the center cores.

<Example 4>

In this example, the dimensions of a composite hollow structure were set such that the wall thickness of the outer layer was set at 0.7 mm; the wall thickness of the intermediate layer was set at 2 mm; and the outer dimension of the center core was set at 26.3 mm×24.6 mm. Like Example 3, the fiber-reinforced composite hollow structure uniform in wall thickness of the intermediate layer and less in strain of the hollow portion was obtained.

<Example 5>

A fiber-reinforced composite hollow structure, in which the wall thickness of each of a center core, an intermediate layer and an outer layer was the same as that in Example 3 and only the outer dimension was 5 mm larger than that in Example 3 (i.e., 65 mm×35 mm), was prepared in the same manner as that in Example 3. The outer dimension of the center core was set at 29.9 mm×31.0 mm. Like Example 3, the fiber-reinforced composite hollow structure uniform in wall thickness of the intermediate layer and less in strain of the hollow portion was obtained. Since the height was set at 35 mm, a good bending rigidity (per unit weight) was obtained.

<Example 6>

The wall thickness of the intermediate layer in Example 1 was set at 2.5 mm. (The wall thickness of the outer layer was set at 1 mm, and the wall thickness of the center core was set to be larger than 1.4 mm.)

<Example 7>

The wall thickness of the center core was set at 1 mm.

<Example 8>

The wall thickness of the intermediate layer in Example 3 was set at 2.5 mm, and the wall thickness of the outer layer was set at 0.7 mm.

<Comparative Example 1>

A fiber-reinforced composite hollow structure of a type with no legs was manufactured using a center core having the outer dimension of 53 mm×23 mm. Each of a dispersion guide and a squeezing nozzle, having no hole equivalent to the leg and having only one guide hole for the center core, was designed like Example 1. The unevenness in wall thickness of an intermediate layer and strain of a hollow portion of the center core are very large because there are no legs.

<Comparison of Measurement Results between Examples 1 to 8 and the Comparative Example>

The physical properties and results of measuring dimensions of portions in Examples 1 to 8 and Comparative Example are shown in Tables 1 and 2.

TABLE 1

| | Outer dimension (design) | Number of legs | Wall thickness (mm) of outer layer | Wall thickness of intermediate layer outer periphery (leg) | Wall thickness of center core outer dimension (mm) | Unit weight (g/m) | Bending rigidity × $10^8$ (kg · mm$^2$) |
|---|---|---|---|---|---|---|---|
| Example 1 | 60 × 30 | 1 | 1.0 | 1.3–0.2 (1.4–0.3) | 1.4 26.9 × 25.4 | 1080 | 1.94 |
| Example 2 | 60 × 30 | 1 | 1.0 | 2.0–0.2 (2.2–0.4) | 1.4 25.9 × 24.0 | 1310 | 2.52 |
| Example 3 | 60 × 30 | 1 | 0.7 | 1.3–0.2 (1.3–0.2) | 1.4 27.4 × 26.0 | 1020 | 2.01 |
| Example 4 | 60 × 30 | 1 | 0.7 | 2.0–0.2 (2.0–0.3) | 1.4 26.3 × 24.6 | 1260 | 2.63 |
| Example 5 | 65 × 35 | 1 | 0.7 | 1.3–0.2 (1.3–0.2) | 1.4 29.9 × 31.0 | 1140 | 3.09 |
| Example 6 | 60 × 30 | 1 | 1.0 | 2.5–0.3 (3.0–0.5) | 1.4 25.2 × 23.0 | 1430 | 2.88 |
| Example 7 | 60 × 30 | 1 | 1.0 | 2.5–0.3 (3.2–0.8) | 1.0 25.2 × 23.1 | 1420 | 2.87 |
| Example 8 | 60 × 30 | 1 | 0.7 | 2.5–0.2 (2.5–0.3) | 1.4 25.6 × 23.6 | 1400 | 3.03 |
| Comparative Example 1 | 60 × 30 | 0 | 0.8 | 2.5–1.4 (-) | 1.5 53.0 × 23.0 | 1300 | 3.01 |

(1) The wall thickness and outer dimension of the center core are indicated by values (average values) of a single center core before being molded into a composite structure.
(2) The wall thickness of the intermediate layer is indicated by an average value and its variation range at the outer periphery and an average value and its variation range at the leg.

TABLE 2

| | Deformation (mm) of hollow portion of center core | Compressive tension (kg) | Rigidity per unit weight × $10^8$ | Compressive strength per unit weight (kg/kg/m) | Bending strength (kg) | Strength per unit-weight (kg/kg/m) |
|---|---|---|---|---|---|---|
| Example 1 | Lateral 0.2 Longitudinal 0.25 | 1510 | 1.80 | 1400 | 650 | 600 |
| Example 2 | Lateral 0.15 Longitudinal 0.25 | 1880 | 1.94 | 1440 | 760 | 580 |
| Example 3 | Lateral 0.10 Longitudinal 0.15 | 1470 | 1.97 | 1440 | 620 | 610 |
| Example 4 | Lateral 0.15 Longitudinal 0.25 | 1790 | 2.09 | 1420 | 730 | 580 |
| Example 5 | Lateral 0.15 Longitudinal 0.15 | 1590 | 2.71 | 1390 | 600 | 530 |
| Example 6 | Lateral 0.35 Longitudinal 0.45 | 1880 | 2.01 | 1310 | 770 | 570 |
| Example 7 | Lateral 0.45 Longitudinal 0.60 | 1860 | 2.02 | 1310 | 810 | 570 |
| Example 8 | Lateral 0.25 Longitudinal 0.40 | 1910 | 2.16 | 1360 | 840 | 600 |
| Comparative Example 1 | Lateral 0.15 Longitudinal 1.80 | 1670 | 2.39 | 1280 | 640 | 490 |

*The rigidity per unit weight is expressed in kg · mm$^2$/kg/m.

The values of wall thickness and the outer dimension of the center core are the average values of a single center core before molding into a composite structure. The wall thickness of the intermediate layer is indicated by an average value and its variation range at the outer periphery, and an average value and its variation range at the leg.

<Example 9>

While the above-described examples describe fiber-reinforced composite hollow structures each including two center cores and the manufacturing methods thereof, there will be hereinafter described a fiber-reinforced composite hollow structure including three or more of center cores and a manufacturing method thereof in the following example.

In this example, referring to FIG. 1(a), five pipe materials are simultaneously, continuously extrusion-molded from the ABS resin (Y672B, produced by Ube Cycon, Ltd.) using the extruder 1, and were subjected to inside diameter sizing using a mandrel to be formed into rectangular pipes (225 g/m) as center cores. (The ratio of the long side (width) to the short side (height) was 1.38.) The wall thickness was 1.5 mm, and the outer dimension was 37.6×30 mm (inner dimension was 34.6×27 mm). The five pieces of the center cores were then continuously supplied by the pultruder 3.

On the other hand, 426 pieces of the glass rovings (RS-440RR-526) produced by Nitto Boseki Co., Ltd. as reinforcing long-fibers were allowed to pass through the impregnation bath 5 so as to be impregnated with an unsaturated polyester resin, and then allowed to pass through the dispersion guides and the squeezing nozzles, whereby the five center cores were integrally surrounded by the glass fiber bundles impregnated with the unsaturated polyester resin. (The above unsaturated polyester resin contains: 75 parts by weight of U-pica 3464 produced by Japan U-pica Co., Ltd.; 25 parts by weight of a contraction reducing agent A-02 produced by the same; 4 parts by weight of Cadox BCH-50 produced by Kayaku AKZO Corporation; and 0.5 part by weight of Kayabutyl B produced by the same.)

The shapes and arrangements of the squeezing nozzles used in this example are shown in FIGS. 5(a), (b) and (c). First, as shown in FIG. 5(a), in a state in which the five center cores were juxtaposed from right to left, the glass fiber bundles impregnated with the unsaturated polyester were squeezed such that the fiber bundles are disposed at the outer periphery of the final molded-product and at the legs positioned between each adjacent center cores. Then, as shown in FIG. 5(b), each center core block was integrally squeezed. Thereafter, as shown in FIG. 5(c), all of the center core blocks were squeezed to be integrated with each other. In this case, the GC is set at 91% of a predetermined value at the step shown in (a), 96% at the step shown in (b), and 100% at the step shown in (c).

Figure 6:
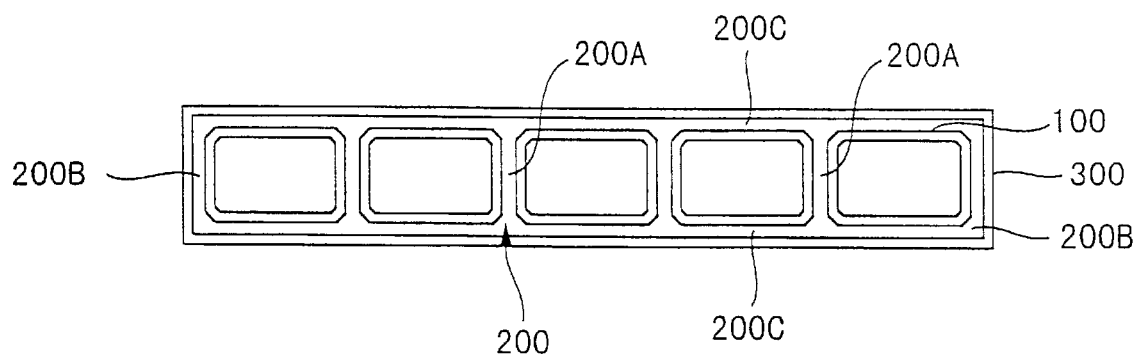
FIG. 6 is a side view of a fiber-reinforced composite hollow structure finally obtained in Example 9.

After the integrated product has passed through the final squeezing nozzle, an ABS resin (Cycorac GSE.450, produced by Ube Cycon, Ltd.) was extruded from a die mouth having an elliptic shape (300×120 mm) to cover the product. The product was then cured at 95° C. in a curing tank (length: 12 m) and was pultruded by the pultruder. At this time, the pultruding rate was set at 1.8 m/min. Finally, the cured product was subjected to an after-curing treatment for 48 hrs in a drying furnace kept at 80° C., to thus obtain a fiber-reinforced composite hollow structure having a shape shown in FIG. 6 with and outer dimension of 200×36 mm and unit-weight of 4040 g/m). Referring to FIG. 6, the thickness of an intermediate layer 200 was: 2.0 mm at each of legs 200A; 1.0 mm at both side surface portions 200B; and 2.0 mm at each of upper and lower surface portions 200C.

As a result of evaluation of the compressive strength, the thus-obtained structure exhibited a good value, with the hollow portion less deformed.

<Comparative Example 2>

Figure 7:
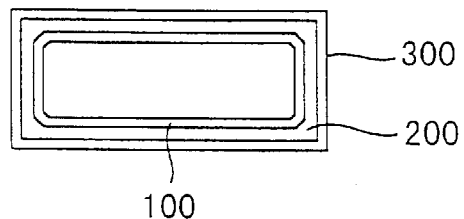
FIG. 7 is a side view of a fiber-reinforced composite hollow structure finally obtained in Comparative Example 2.

It is not possible to manufacture a structure having the same outer dimension of 200×36 mm as that in Example 9 without legs. So in this example, there was obtained a fiber-reinforced composite hollow structure with an outer dimension of 66×36 mm (accordingly, the same height as that in Example 9) having a three-layer structure including one rectangular center core having the outer dimension of 60×30 mm and the inner dimension of 57×27 mm, an intermediate layer (thickness: 2.0 mm) made from glass rovings (S-440, RR-526) impregnated with an unsaturated polyester resin in an impregnation bath, and an outer layer (thickness: 1.0 mm) made from a thermoplastic resin. (See FIG. 7.) The manufacturing method was the same as that in Example 9. In addition, the ratio of a long side (width) to a short side (height) of the hollow portion of the center core is 2.11/1, that is, larger than the ratio of 1.5/1.

For the fiber-reinforced composite hollow structure thus obtained, deformation of the hollow portion, particularly, deformation and depression of the long side were larger.

The results of Example 9 and Comparative Example 2 are shown in Table 3.

TABLE 3

| | Thickness of FRP | Outer dimension | Unit-weight | Compressive strength |
|---|---|---|---|---|
| Example 9 | 2.0 mm | $200^w * 36^h$ mm | 4040 g/m (20200 g/m$^2$) | 92 kg/cm$^2$ |
| Comparative Example 2 | 2.0 mm | $66^w * 36^h$ mm | 1350 g/m (20450 g/m$^2$) | 58 kg/cm$^2$ |

In the table above, the compressive strength was obtained by cutting the fiber-reinforced composite hollow structure into a length of 50 mm to prepare a test piece, subjecting the test piece to a flat plate type compression test at a speed of 1.0 mm/min, and dividing the load applied to the test piece upon compression breakage by the surface area of the test piece. Here, the surface area of the test piece in Example 9 was 50×200 mm$^2$, and the surface area of the test piece in Comparative Example 2 is 50×66 mm$^2$.

In Example 9, the ratio of the long side to the short side of the hollow portion is 1.28 which is close to 1, and the height becomes as small as about 30 mm, so that deformation of the hollow portion scarcely occurs and the strength is high. This structure is also preferably reduced in weight.

In addition, by moving the positions of the dispersion guides and the squeezing nozzles used in Example 9 in the lateral direction and only replacing the final squeezing nozzle in Example 9 with a new one, a fiber-reinforced composite hollow structure with a cross-sectional dimension of 160.4×36 mm including four pieces of center cores can be manufactured without a large change in equipment. Further, by using only the three center cores positioned on the central side and omitting the center cores on both sides, a fiber-reinforced composite hollow structure with a cross-sectional dimension of 120.6×36 mm including three pieces of center cores can be manufactured without a large change in equipment. In this case, the same squeezing portion can be used as it is, and the other parts of the equipment such as the covering die can be easily replaced with new ones without drastic change.

<Example 10>

Figure 8:
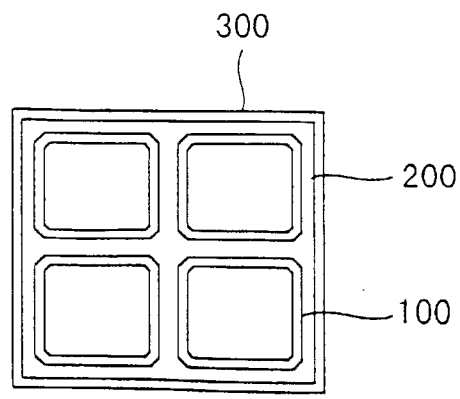
FIG. 8 is a side view of a fiber-reinforced composite hollow structure finally obtained in Example 10.

As shown in FIG. 8, a fiber-reinforced composite hollow structure in which the section thereof was arranged in a crisscross-shape was manufactured. In this structure, the outer dimension of the structure was set at 60×60 mm; the thickness of the outer layer was set at 1.0 mm; the outer dimension of the intermediate layer was set at 58×58 mm; and the outer dimension of the center core was set at 26.25×26.25 mm (thickness: 1.5 mm).

A center core of 26.25×26.25 mm and thickness of 1.5 mm (unit-weight: 150 g/m) was extruded from ABS resin (Y672B, produced by Ube Cycon, Ltd.) using a square mandrel, and cut into a length of 7 m. Four pieces of center cores were separated into two groups located on the upper and lower stages and supplied by pinch rollers.

Figure 9:
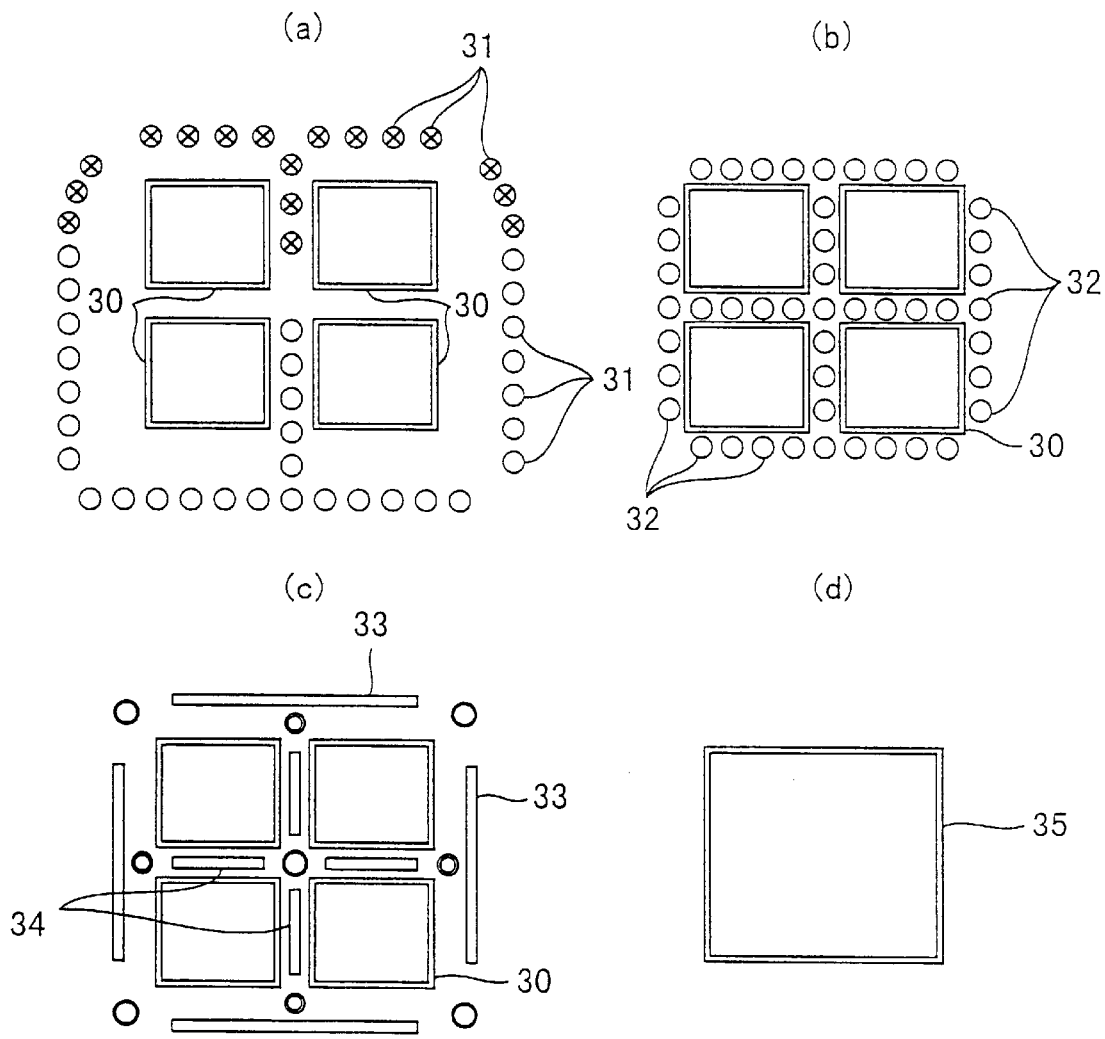
FIGS. 9(a) to 9(d) are front views each showing configurations of a dispersion guide and a squeezing nozzle in Example 10.

On the other hand, 232 pieces of glass rovings as reinforcing long-fibers were separated into two groups and were respectively allowed to pass through upper and lower impregnation baths (not shown) so as to be impregnated with an unsaturated polyester resin. As shown in FIG. 9(a), these glass rovings were disposed around the respective center cores through a number of dispersion guide holes 31 arranged around four pieces of center core guide holes 30. Furthermore, the dispersion guide holes for dispersing the glass rovings impregnated with the unsaturated polyester resin in the upper impregnation bath were indicated by marks (x).

The glass rovings impregnated with the resin were guided by dispersion guides shown in FIG. 9(b), being squeezed up to a specific GC by squeezing nozzles shown in FIG. (c), and were collectively squeezed by a squeezing nozzle 35 shown in FIG. (d) to be integrated with each other. At this time, the FRP of a portion of the intermediate layer at the outer periphery was squeezed up to a specific GC. Here, at squeezing nozzles 33 and 34 shown in FIG. 9(c), the outer periphery 33 was squeezed up to the GC of 53 vol % (95% of a predetermined GC) and each of legs 34 except the outer periphery (i.e., the crossing portion and corners between the center cores and the outer periphery) was squeezed up to 56 vol % (100% of the predetermined GC). With this adjustment, the thickness of a portion of the intermediate layer at the leg can be set at a predetermined value, and also, the center cores can be integrated with the intermediate layer by the squeezing pressure of the FRP of the portion of the intermediate layer at the outer periphery. Then, a covering was extruded from a covering die (not shown) having a ring-like discharge port to cover the product. At this time, the thickness of the covering was set at 1 mm. The thus-obtained product covered with the resin was subjected to water-cooling sizing using a sliding type sizing nozzle, and cured in a hot water curing tank at 95° C. The pultruding speed was set at 1.5 m/min. Finally, the cured product was subjected to after-curing treatment in a drying furnace kept at 80° C. The structure thus obtained was subjected to compression test.

As a result of the test, the hollow portion of the center core exhibited a square shape with no deformation, with a good accuracy in shape and with high strength.

<Comparative Example 3>

Figure 10:
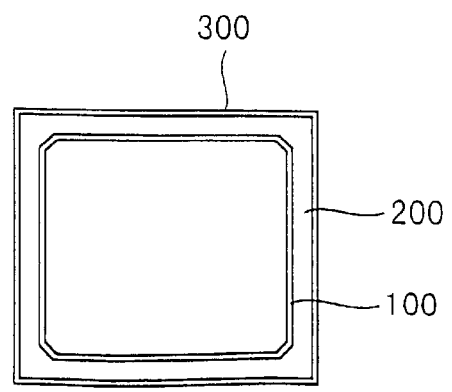
FIG. 10 is a side view of a fiber-reinforced composite hollow structure finally obtained in Comparative Example 3.

As shown in FIG. 10, a fiber-reinforced composite hollow structure of a three-layer pipe-type having a square cross-section was manufactured. In this structure, the outer dimension of the structure was set at 60 ×60 mm; the thickness of the outer layer was set at 1.0 mm; the outer dimension of the intermediate layer was set at 58×58 mm; and the outer dimension of the center core was set at 53×53 mm (thickness: 1.5 mm).

The center core was continuously molded using a mandrel. Then, 216 pieces of glass rovings were impregnated with unsaturated polyester resin, being disposed around the center core through dispersion guides, and squeezed up to a specific GC (56 vol %) using a square-shaped squeezing nozzle with a central portion of each side deformed into a projecting shape. This product was covered with ABS resin. At this time, the covering thickness was set at the same value as that in Example 10, that is, 1 mm. The covered product was, like Example 10, subjected to water-cooling sizing, curing, and after-curing treatment. The structure thus obtained was then subjected to compression test. A central portion of each side of the hollow portion was slightly recessed inwardly (to the center side), with a variation in thickness of the intermediate layer (a difference between the maximum thickness and the minimum thickness: 0.5 mm).

<Example 11>

Figure 11:
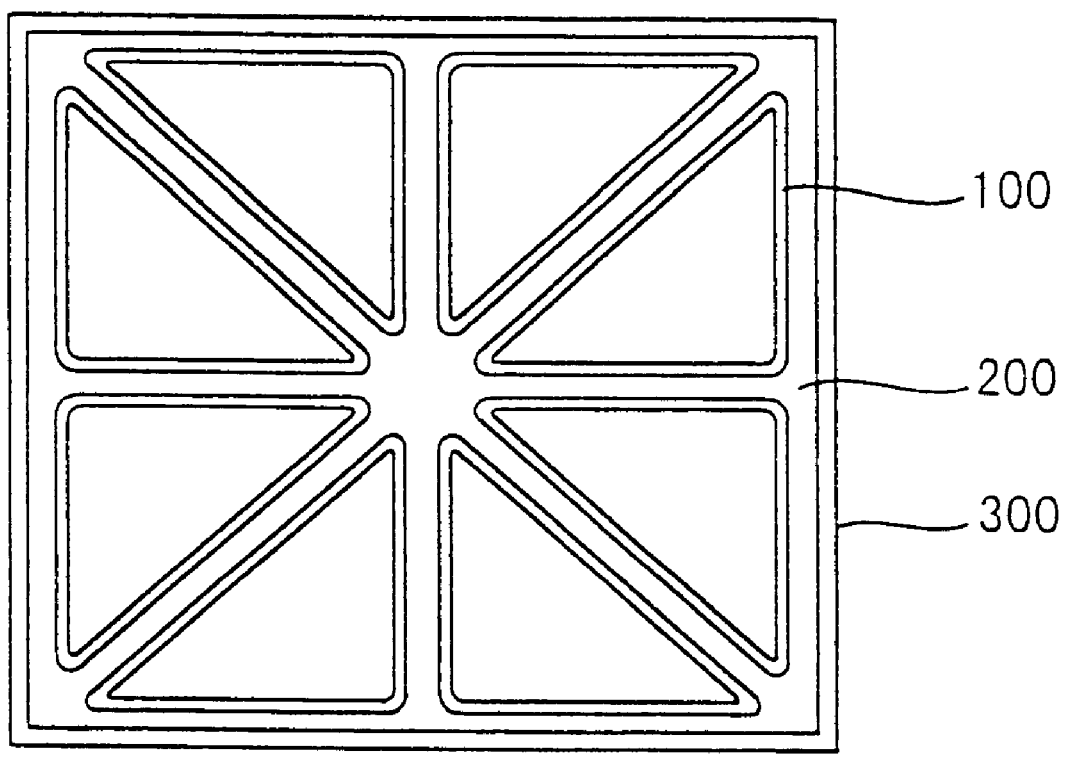
FIG. 11 is a side view of a fiber-reinforced composite hollow structure finally obtained in Example 11.

As shown in FIG. 11, a fiber-reinforced composite hollow structure having a truss structure was manufactured using center cores each being formed into a right triangle shape (dimensions of sides: about 22, 22, 32 mm) in cross-section. In this structure, the outer dimension of the structure was set at 60×60 mm; the thickness of the outer layer was set at 1.0 mm; and the outer dimension the intermediate layer was set at 58×58 mm. In addition, the thickness of the intermediate layer was set at 2 mm at the outer periphery, and 1.5 mm at each leg. The thickness of the center core was set at 1.0 mm.

Figure 12:
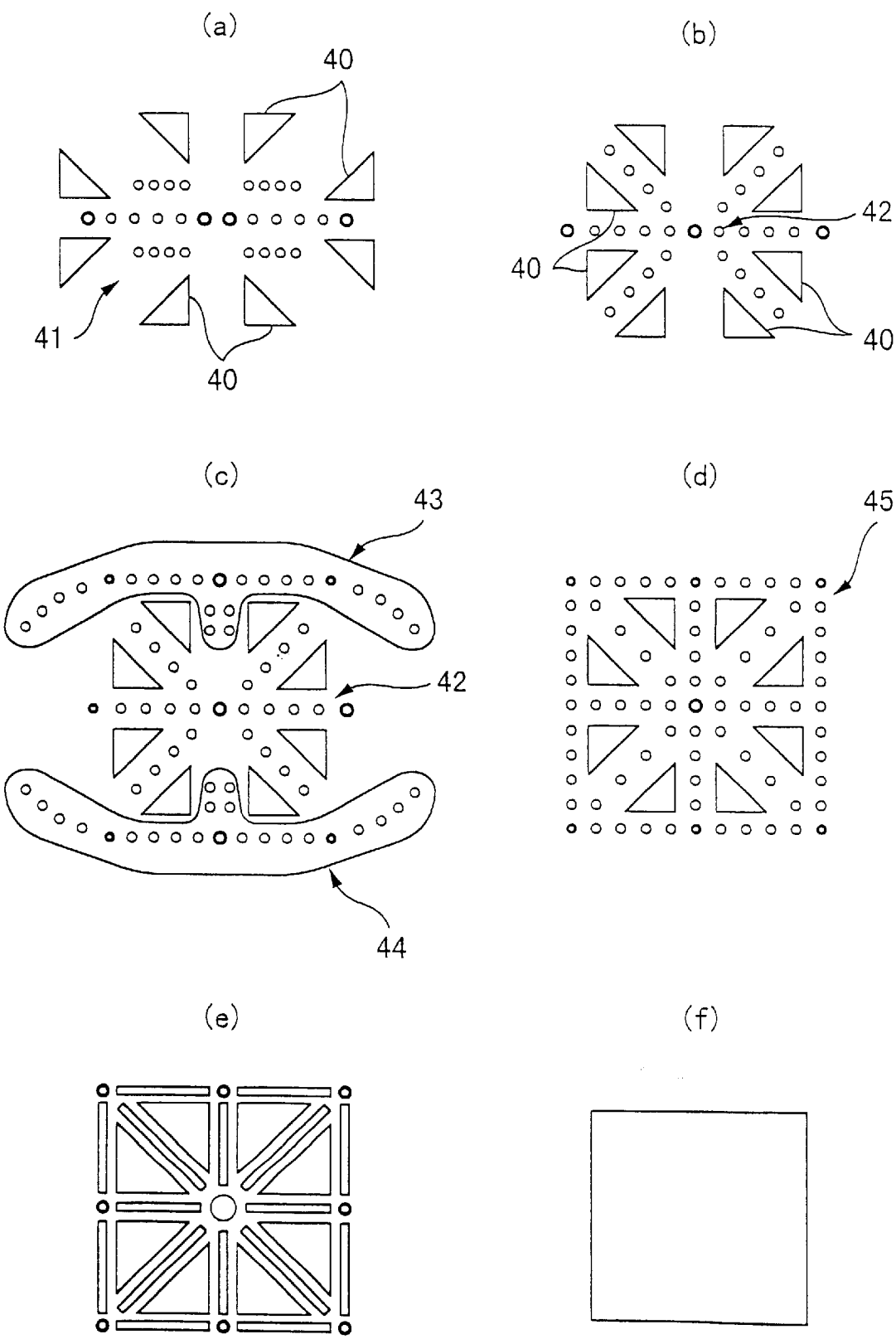
FIGS. 12(a) to 12(f) are front views each showing configurations of a dispersion guide and a squeezing nozzle in Example 11.

The center core was extrusion-molded using a mandrel and cut into a length of 7 m. The center cores were separated into two groups of four pieces located on the upper and lower stages and supplied (see FIG. 12(a)). Then, 308 pieces of glass rovings were separated into three groups which were respectively impregnated with a resin in three impregnation baths.

The forms and arrangements of dispersion guides and squeezing nozzles, which are sequentially changed from the upstream side, are as shown in FIGS. 12(a) to (f). First, a number of dispersion guides 41 are, as shown in FIG. (a), horizontally disposed between center core guide holes 40. Then, dispersion guides 42 are, as shown in FIG. (b), disposed obliquely in the +45° direction and the −45° direction as the center core guide holes 40 are shifted gradually close to each other. Then, glass rovings are introduced through upper and lower dispersion guide holes 43 and 44, as shown in FIG. (c) as the center core guide holes 40 are further shifted close to each other. Then, the final position was substantially determined substantially finally positioned by final dispersion guides 45 shown in FIG. (d). Thereafter, the unsaturated polyester resin was squeezed by squeezing nozzles shown in FIG. (e) and was then finally squeezed through a final squeezing nozzle shown in FIG. (f) to be thus integrated as a whole. Of the dispersion guide holes, those positioned at the central portion and corner portions for guiding the glass rovings are emphasized by black circles.

Before integration, a portion of the FRP at the outer periphery was squeezed up to 95% of a predetermined GC value, and each leg was squeezed up to 100%. Then, the integrated product was covered with an ABS resin using the same nozzle as that in Example 10. At this time, the thickness of the covering was set at 1 mm. The covered product was subjected to water-cooling sizing to be cured. The pultruding speed was set at 1.5 m/min. For the structure thus obtained, there was no deformation of the hollow portion. The compressive strength of the structure measured after post-treatment thereof at 80° C. for 48 hrs was high.

The results of Examples 10 and 11 and Comparative Example 3 are shown in Table 4.

TABLE 4

|  | Thickness of FRP | Outer dimension | Unit-weight | Compressive strength | Compressive strength per unit-weight |
| --- | --- | --- | --- | --- | --- |
| Example 10 | 2.0 mm (1.5) | 60*60 mm | 2230 g/m | 130 kg/cm$^2$ | 58.3 kg/cm$^2$/kg/m |
| Example 11 | 2.0 mm (1.5) | 60*60 mm | 2740 g/m | 220 kg/cm$^2$ | 80 kg/cm$^2$/kg/m |
| Comparative Example 3 | 2.5 mm | 60*60 mm | 1850 g/m | 49 kg/cm$^2$ | 26.5 kg/cm$^2$/kg/m |

<Example 12>

Figure 13:
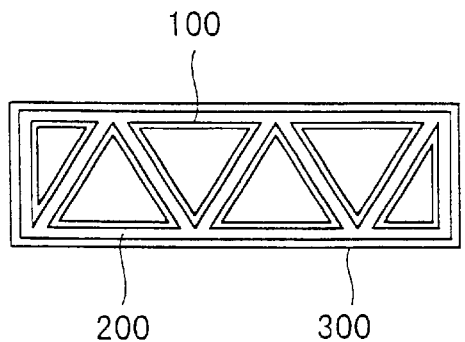
FIG. 13 is a side view of a fiber-reinforced composite hollow structure finally obtained in Example 12.

As shown in FIG. 13, a fiber-reinforced composite hollow structure having a truss structure in cross-section was manufactured. In this structure, the outer dimension of the structure was set at 80.6×27.8 mm; the outer dimension of the intermediate layer was set at 79.2×26.4 mm; and the thickness of the intermediate layer was set at 1.5 mm.

A total of six center cores, specifically, four approximately equilateral-triangular center cores A and two right-triangular center cores B equivalent to half of the aforesaid equilateral triangle, were arranged in such a manner as to be alternately reversed. ABS resin (Y672B, produced by Ube Cycon, Ltd.) was used and was shaped by outside-diameter cooling sizing using a vacuum sizing water bath and a sizing nozzle, and was cut into a length of about 15 m. The products thus obtained was taken as a the center cores and were supplied using pinch rollers.

Figure 14:
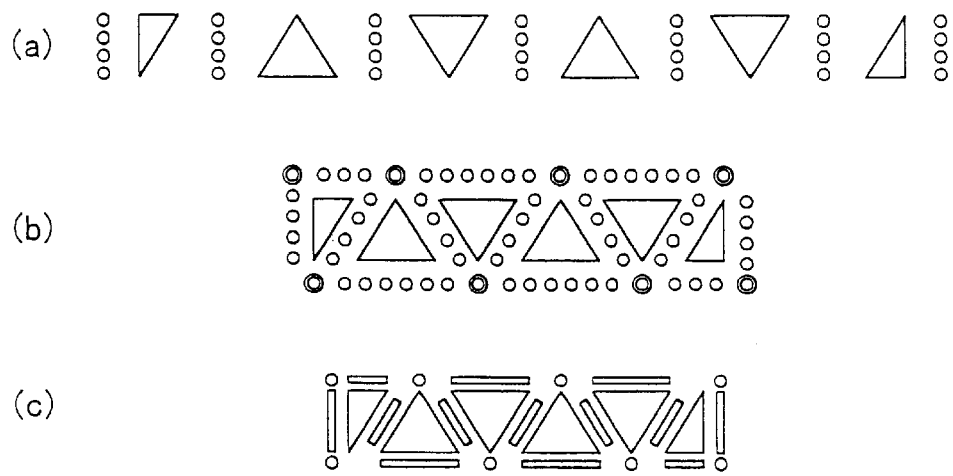
FIGS. 14(a), 14(b) and 14(c) are front views each showing configurations of a dispersion guide and a reduction nozzle in Example 12.

In this example, the upper, medium and lower stages of the impregnation baths 5a, 5b and 5c shown in FIG. 1(b) were used. Groups of glass fibers equivalent to upper and lower surface portions, leg portions, and side surface portions of an intermediate layer were introduced from these impregnation baths into dispersion guides and squeezing nozzles shown in FIGS. 14(a), (b) and (c). First, the group of the glass fibers for forming the leg portions of the intermediate layer were pultruded from the medium impregnation bath and were arranged through the dispersion guides (see FIG. 14(a)), and then the groups of the glass fibers for forming the upper and lower surfaces were pultruded from the upper and lower impregnation baths and were arranged through the dispersion guides (see FIG. 14(b)).

At the stage before integration, the glass fibers at the portions tilted at 60° were squeezed up to the GC of 100% of a predetermined value (56 vol %), and the upper and lower portions and the side surface portions were squeezed up to the GC of 95% of the predetermined value (53 vol %) using squeezing nozzles. At the integration stage, the GC was set at 56 vol %.

<Example 13>

Figure 15:
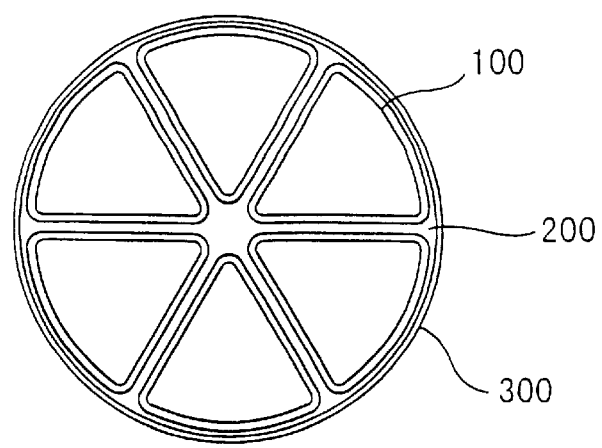
FIG. 15 is a side view of a fiber-reinforced composite hollow structure finally obtained in Example 13.
Figure 17:
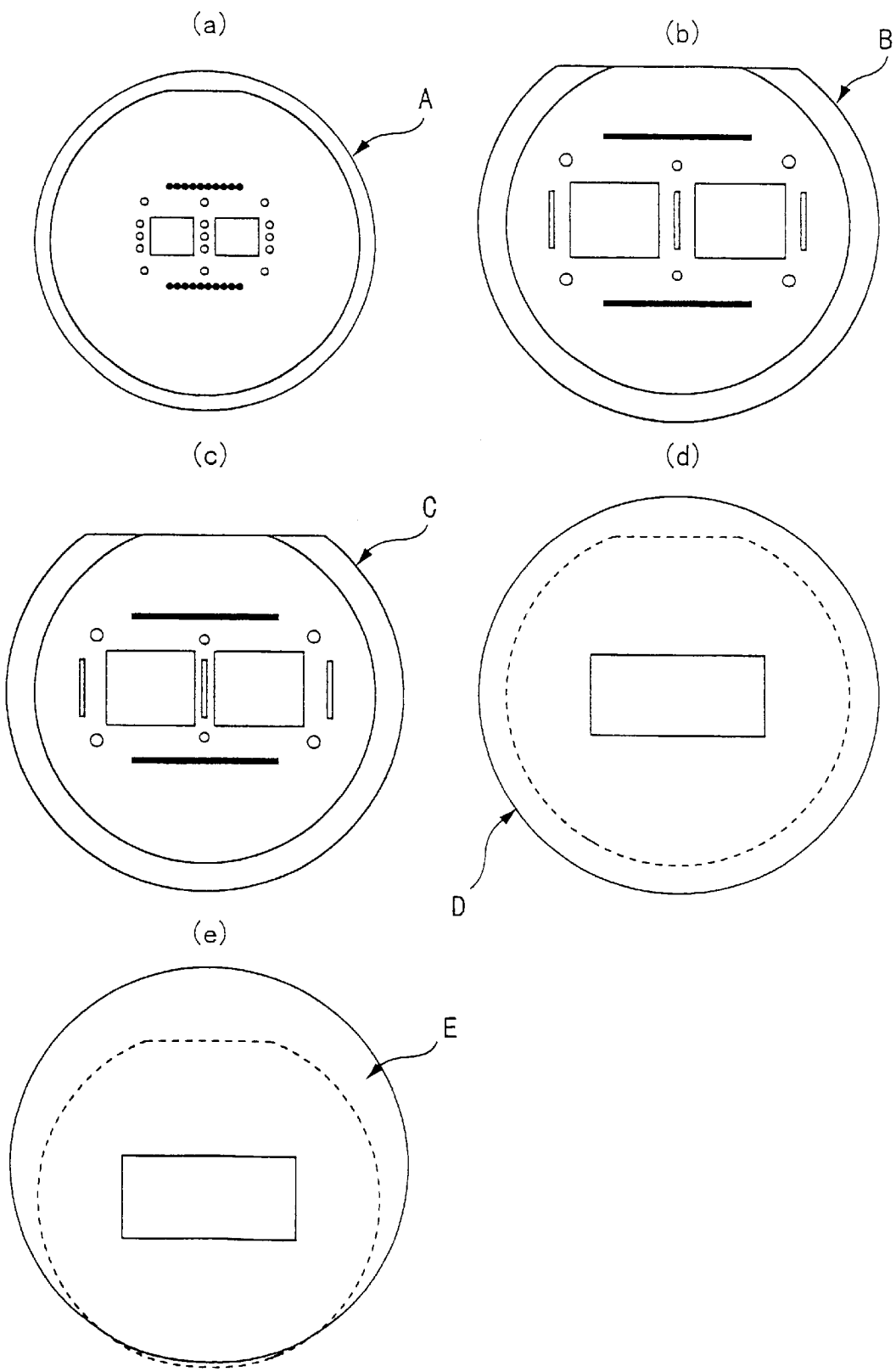
FIGS. 17(a) to 17(e) are front views showing squeezing nozzles A, B, C, D and E used in a second invention, respectively.

As shown in FIG. 15, a circular pipe was prepared using six pieces of fan-shaped center cores each having a center angle of 60°. In this pipe, the outside diameter of the pipe was set at 60 mm; the thickness of the outer layer was set at 0.7 mm; the thickness of the intermediate layer was set at 1.5 mm; and the thickness of the center core was set at 1.3 mm. The center core was formed by extrusion-molding with outside-diameter sizing by a vacuum sizing method. These center cores were supplied in a state being separated into two groups located on upper and lower stages. Glass fibers were impregnated with a resin using upper, medium and lower stages of impregnation baths. The manufacture was carried out in accordance with steps shown in FIGS. 16(a) to (f). Before integration, the glass fibers at the central portion were squeezed up to the final GC of 100% (i.e., 100%, 56 vol %), like the previous examples.

-Second Invention-

<Example 1>

A hollow pipe material (center core), having a width of 27.07 mm, height of 25.51 mm, and wall thickness of 1.42 mm, was extrusion-molded from ABS resin (trade name: Y672B, produced by Ube Cycon, Ltd.) as a PS based thermoplastic resin, followed by inside diameter sizing using a mandrel having a specific dimension. The thermal deformation temperature of the above Y672B was 88° C. (in accordance with ASTM D648 at a load of 18.6 kg/cm$^2$).

Two pieces of these center cores were juxtaposed to the right and left and supplied by a pultruder. On the other hand, 80 pieces of glass rovings (trade name: RS-440RR-526, produced by Nitto Boseki Co., Ltd.) and 11 pieces of glass rovings (trade name: RS-220RR-510, produced by the same) as reinforcing long-fibers were allowed to pass through an impregnation bath so as to be impregnated with an unsaturated polyester resin. (The unsaturated polyester resin contains 4 parts by weight of a BPO based Cadox BCH-50 (trade name, produced by Kayaku AKZO Corporation) as a peroxide type curing catalyst and 0.5 part by weight of Kayabutyl B (trade name, produced by the same) as a peroxide catalyst.) The rovings were allowed to sequentially pass through squeezing nozzles A, B, C, D and E shown in FIGS. 17(a) to (e) so as to be squeezed and shaped, to obtain a fiber-reinforced composite pipe having a FRP leg.

In this case, the glass fibers at the leg were squeezed almost up to the final GC separately from those at the outer periphery, and then integrated with the center cores and the FRP layer at the outer periphery, to form a FRP layer at the outer periphery. The GC at the legs was set at 53.8 vol %, and that at the outer periphery was set at 54.0 vol %. The integrated product was allowed to pass through a final squeezing nozzle (58.0×27.9 mm, GC: 53.9 vol %) disposed through a cooling jacket in a cross head die, whereby the outer periphery of the product was covered with ABS resin (GSE450, produced by Ube Cycon, Ltd.) in a seamless state. At this time, the thickness of the covered layer was set at 0.9 mm. The covered product was subjected to water-cooling sizing using a sliding type sizing plate, and cured in a hot water curing tank at a temperature of 88 to 90° C. The pultruding speed was set at 0.8 m/min, and the length of the curing tank was set at 8 m.

Figure 18:
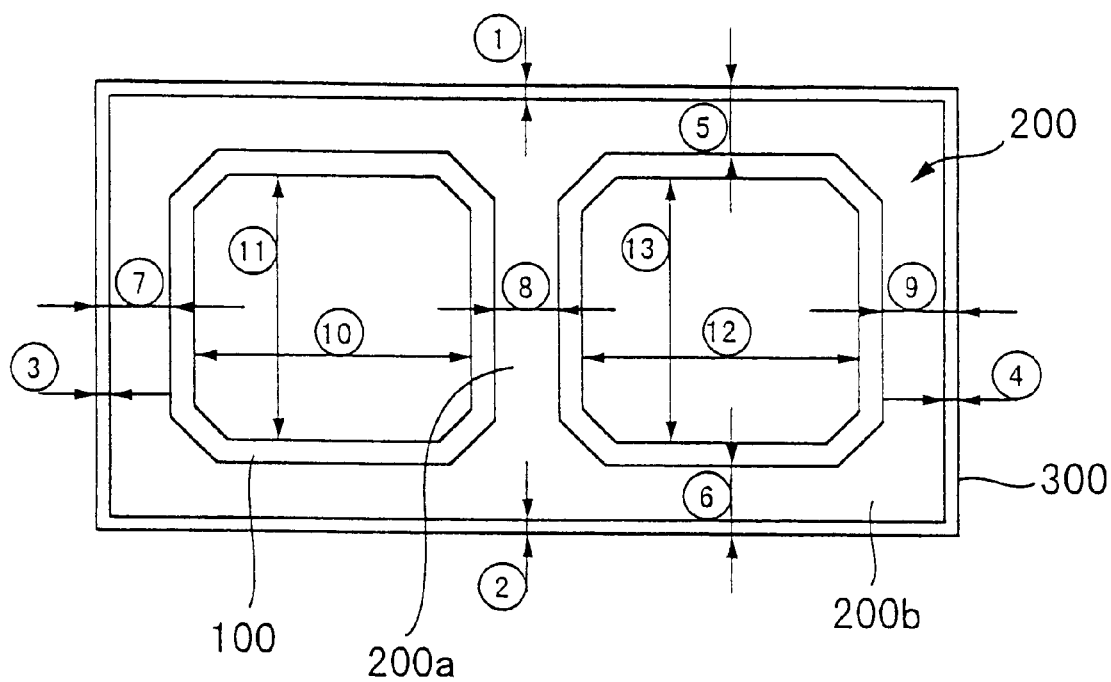
FIG. 18 is a side view of a fiber-reinforced composite pipe finally obtained in each of Examples 1 to 3 and Comparative Examples 1 and 2 in the second invention.

The cured product was cooled in a cooling bath, being pultruded by a pultruder, and was cut into a specific length. A fiber-reinforced composite pipe finally obtained has, as shown in FIG. 18, a three-layer structure including two center cores 100, a FRP made intermediate layer 200 (leg 200a, outer peripheral portion 200b), and a thermoplastic resin-made outer layer 300. The pipe is formed into a rectangular shape having a width of about 60 mm and thickness of about 30 mm having two hollow portions.

The results of measurement of the shape of the fiber-reinforced composite thus manufactured are shown in Table 5. A sample was thinly sliced into a thickness of about 3 mm, and the end surface thereof was polished. Using these samples, the thickness of FRP and longitudinal and lateral dimensions of the center core were measured by a microscope magnification of ×5. It is to be noted that numerical numbers in round circles in Table 5 indicate dimensions of portions shown by the same numerical numbers in round circles in FIG. 18.

TABLE 5

| Example | Example 1 | Comparative Example 1 | Example 2 | Example 3 | Comparative Example 2 |
|---|---|---|---|---|---|
| Resin for center core | Y672B | Y672B | UT-30B | UT-30B | Y672B |
| Curing temperature | 88–90° C. | 98–100° C. | 88–90° C. | 98–100° C. | 93–95° C. |
| Thickness of FRP | | | | | |
| ⑤ | 1.39 | 1.26 | 1.27 | 1.31 | 1.33 |
| ⑥ | 1.25 | 1.47 | 1.47 | 1.48 | 1.38 |
| ⑦ | 1.20 | 1.16 | 1.23 | 1.23 | 1.18 |
| ⑧ | 1.48 | 1.71 | 1.35 | 1.44 | 1.66 |
| ⑨ | 1.19 | 1.17 | 1.24 | 1.23 | 1.21 |
| Size of center core | | | | | |
| ⑩ | 22.33 | 21.82 | 22.45 | 22.24 | |
| | (22.68) | (←) | (22.53) | (←) | |
| ⑪ | 23.83 | 23.75 | 24.05 | 24.13 | |
| | (24.06) | (←) | (24.16) | (←) | |
| ⑫ | 22.29 | 21.70 | 22.41 | 22.37 | |
| ⑬ | 23.86 | 23.82 | 24.13 | 24.06 | |
| Deformation of center core | | | | | |
| ⑩ | −0.35 | −0.86 | −0.08 | −0.29 | −0.55 |
| ⑪ | −0.23 | −0.31 | −0.11 | −0.06 | −0.29 |
| ⑫ | −0.39 | −0.98 | −0.12 | −0.16 | −0.67 |
| ⑬ | −0.20 | −0.24 | −0.03 | −0.10 | −0.20 |

The numerical value in the parenthesis indicates the inside diameter of the center core before curing of FRP. The unit used herein is mm.

In Table 5, deformation of the center core is indicated by a difference in dimension along each of the longitudinal and lateral directions before and after curing (fiber-reinforcement). As is apparent, a fiber-reinforced composite pipe having a uniform thickness of FRP, less deformation of the center core, and desirable accuracy in shape was obtained.

<Comparative Example 1>

A fiber-reinforced composite resin pipe was prepared in the same manner as that in Example 1 except that the curing temperature was set at a value of 98 to 100° C. The results of measuring the shapes are shown in Table 5. Since the curing temperature was higher than the thermal deformation temperature of the ABS resin for forming the center core, the deformation of the center core became large and the unevenness in thickness of the FRP portion also became large. In particular, the thickness of the leg (at the central portion) became large because the center core was deformed in such a manner as to project inwardly.

<Comparative Example 2>

A fiber-reinforced composite resin pipe was prepared in the same manner as that in Example 1 except that the curing temperature was set at a value of 93 to 95° C. The results of measuring the shapes are shown in Table 5. Alike Comparative Example 1, the deformation of the center core became large and the unevenness in thickness of the FRP portion also became large. In particular, the thickness of the leg (at the central portion) became large because the center core was deformed in such a manner as to project inwardly.

<Example 2>

Center cores were prepared in the same manner as that in Example 1 using a heat-resisting ABS resin (UT-30B, produced by Ube Cycon, Ltd.) having a thermal deformation temperature of 106° C. The shape was 27.07 mm×25.4 mm. Like Example 1, the curing was implemented at a curing temperature of 88 to 90° C. The results of measuring dimensions are shown in Table 5. Since the center core had a high heat resistance (thermal deformation temperature: 100° C. or more) and the curing temperature was adjusted to be in the range of 88 to 90° C., the deformation of the center core was small and also the unevenness in thickness of the FRP layer was small. In this way, there was obtained a fiber-reinforced composite pipe with a high accuracy.

<Example 3>

A fiber-reinforced composite resin pipe was manufactured in the same manner as that in Example 2 except that the curing temperature was set at a value of 98 to 100° C. The results of measurement of shapes are shown in Table 5. The accuracy in shape of the fiber-reinforced composite pipe was slightly inferior to that of Example 2 but was comparable to that of in Example 1. According to this example, it is apparent that even if the thermal deformation temperature of the center core is set at 100° C. or more and the curing temperature is set at about 100° C., there can be molded a fiber-reinforced composite pipe having less deformation than the one in Comparative Example 1 at a high molding rate.

-Third Invention-

Figure 19:
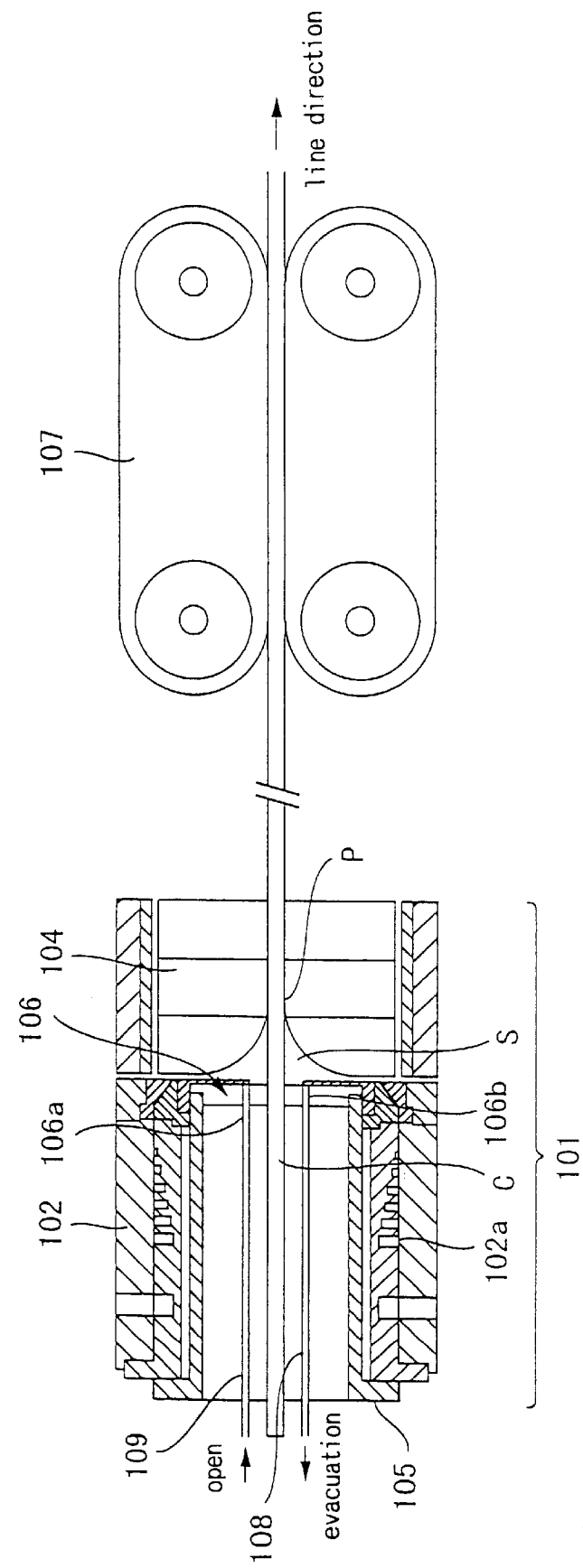
FIG. 19 is a sectional side view showing part of a manufacturing process line containing a manufacturing apparatus according to one embodiment of a third invention.

Hereinafter, preferred examples of a third invention will be described in detail with reference to the accompanying drawings. FIG. 19 is a sectional side view showing part of a manufacturing process line including a hot-extrusion/covering apparatus according to the present invention. FIG. 20(a) is a front view of a jacket nozzle and FIG. (b) is a sectional view taken on line A—A of FIG. 20(a). FIG. 21(a) is a side view of a covering resin heating apparatus, and FIG. (b) is a front view thereof.

A hot-extrusion/covering apparatus 101 includes: a cross head die 102 having a nozzle located on the outer periphery of the member C being covered and adapted to discharge thermoplastic resin for forming an outer layer; and a heating apparatus 104 disposed on the front surface of the discharging side of the cross head die 102 for heating the member C to be covered.

In manufacture of a fiber-reinforced composite hollow structure, ABS resin is extruded from an extruder through the draft type circular cross head die 102, and is heated at its four corners (peripheral portions), excluding front and rear surfaces, by an infrared ray heater 104a disposed around the resin at a position not in contact with the resin. The heater 104a is divided into a plurality of zones (for example, four pieces on the upper and lower sides and the right and left sides) which are independently controllable. It is possible to: prevent reduction in surface temperature of the resin, uneven cooling and uneven temperature due to atmospheric air and its convection; and keep the temperature and the molten-state of the resin in substantially the same condition as that of when the resin is discharged, until the resin covers the uncured core portion.

It is also possible to similarly cover a general molded-product other than an uncured core portion. In this case, the adhesion of the covering resin can be improved by pre-heating the product. In addition, the heating is preferably performed by the above method using infrared rays. The heating using hot air is undesirable because it may entrain atmospheric air from an inlet/outlet for an object to be heated (i.e., from the front and back sides), which may reduce the temperature of the covering resin, and further it may impart vibration to the covering resin.

A lower portion of an inner space S of the outer layer covering (the substantially enclosed space formed between: a nozzle 106 and a cooling jacket through which the pultruded member C to be covered passes through; and the covering resin discharged from a discharge port of the die 102) is evacuated, and the upper portion of the space S is not evacuated, or else, introduced with atmospheric air. With this configuration, the degree of pressure reduction of the inner space S, particularly, the degree of pressure reduction of the lower portion thereof can be set at a high value, so that the upper portion of member c depicts a downward projection and the lower portion of member C depicts an upward projection, whereby the covering is converged at the covering point P in a vertically symmetrical manner.

To cover a molded-product, a space between the cross head die and the introduced product must be sealed for realizing the above evacuation. In this case, a composite hollow structure can be sealed using a ring made from a heat-resisting and flexible material such as Teflon or silicon rubber as a guide or packing. The sealing member is intended to wear out, and therefore, it is to be suitably replaced with a new one. Referring to FIG. 21, the nozzle, jacket and nipple (sheathed core) in the die 102 are also sealed for preventing leakage of air. To be more specific, in the die 102, the nozzle 106 is fitted with the jacket 105, and a space between the jacket 105 and the nipple (sheathed core) is sealed with a heat-insulation packing made from a ceramic material.

In the following description, more specific examples will be given. First, there is shown a case in which application is made to a process of manufacturing a fiber-reinforced composite hollow structure (hereinafter, referred to as "FRP scaffold plate") having a cross-sectional dimension of 240 mm×30 mm.

<Example 1>

In this example, there is manufactured a FRP scaffold plate having a width of 240 mm and thickness of 30 mm and having a three layer structure comprised of: seven center cores made from ABS resin juxtaposed in a parallel manner at specific intervals; an FRP intermediate layer; and an outer cover layer made from an ABS resin. In the above manufacturing process, the step of forming the outer cover layer made from the ABS resin with a specific thickness (1 mm, in this example) was performed using a hot-extrusion/covering apparatus 101 of the present invention, wherein a lower portion of an internal space S of the covering was evacuated.

First, center cores made from an ABS resin was formed by extrusion-molded and by vacuum sizing. Seven pieces of the center cores were juxtaposed and supplied. On the other hand, glass fibers were supplied from a roving stand and impregnated with an unsaturated polyester resin in an impregnation bath. The glass fiber bundles were arranged around the center cores through dispersion guides, followed by squeezing of an excessive amount of the unsaturated polyester resin through squeezing nozzles, and integrated with the center cores. Further, the resin of the outer peripheral portion of the integrated product was squeezingly-molded into a specific shape (width: 238 mm, thickness: 28 mm). (Note that the production line configuration described above is not shown in the Figure.) Then, the integrated product was introduced to a draft type cross head die 102 with a bore of 350 mm shown in FIG. 21, and ABS resin was annularly extruded to cover the outer periphery of the object to be covered, that is, the flat-plate like center core portion impregnated with an uncured polyester resin. In this case, the temperature of the extruder was steppingly changed from 180 to 230° C. at an interval of 10° C. from the hopper side to the die, and the discharged amount of the covering resin was set at 568.16 g/m.

After the covering step, the covering resin was cooled by air-cooling and self-cooling caused by heat transfer to the center portion, and was cured in a hot water curing tank at 95° C. The product thus cured was cooled in a cooling water bath and pultruded by a pultruder 107 at a pultruding speed of 1 m/min.

FIG. 20(a) is a front view of a nozzle 106 and FIG. 20(b) is a sectional view taken on line A—A. The nozzle 106 is formed into a disk shape having a squeezing nozzle hole 106a having a specific shape (238 mm×28 mm, rectangular shape) through which a center core portion passes. The nozzle 106 is mounted on the cross head die 102 on the most downstream side through a cooling jacket 105. On the lower side of the squeezing nozzle hole 106a are formed four pieces of evacuation holes (evacuation ports) 106b in such a manner as to be symmetrical on the right and left sides and to depict a projecting curve. On the other hand, on the upper side of the squeezing nozzle 106a are formed four pieces of atmospheric air introduction holes (air introduction ports) 106c in such a manner as to be symmetrical on the right and left sides and to depict a recessed curve.

As shown in FIG. 19, the evacuation port 106b is connected to one end of a vacuum pipe 108 of which the other end connected to a vacuum pump (not shown). The atmospheric air introduction port 106c is connected to one end of an atmospheric-air communication pipe 109 of which the other end communicated to atmospheric air. The vacuum pipes 108 and the atmospheric air communication pipes 109 are disposed in parallel to the member C to be covered in the die 102.

The internal space S of the covering was evacuated through the evacuation ports 106b, while atmospheric air was introduced through the atmospheric air introduction ports 106c. This is effective to decompress the lower portion of the member C and hence to prevent sagging of the covering resin due to its gravity. In addition, the degree of decompression (degree of vacuum) was set at 50 mm $H_2O$.

The cooling jacket 105 is provided for cooling the nozzle 106 in order to prevent curing of the unsaturated polyester resin and is arranged around the cross head die 102 via a ceramic packing for heat insulation. The space S surrounded by the nozzle 106 and the covering resin forms an independently enclosed space insofar as the covering is not broken.

On the downstream side of the hot-extrusion/covering apparatus 101, as shown in FIG. 21, there is provided a covering resin heating apparatus 104 in which four pieces of ceramic heaters 104a having a width of 400 mm and length of 300 mm are oppositely disposed. By this, a heating space of about 400 mm square and 300 mm in length and which is coaxial with the cross head die 102 is formed. The heater 104a is slidable along slide rails (guide frames) 4b to and from the cross head die 102. The temperature of the four heaters can be independently controlled.

The testing was carried out under the condition that the setting temperature of the heating apparatus 104 was 350° C. The covering point P was set to be 110 mm apart from the front surface of the die. At this point, the surface temperature of the resin the central portion of the upper surface was about 220° C. This is substantially equal to that of the resin directly after extrusion from the die. The covering resin thus formed was in good condition, that is, was less in uneven thickness and exhibited a preferable glossy surface with no wrinkles.

The setting unit-weight for each component of the final product was: 992.84 g/m for seven pieces of the center cores; 1372 g/m for the reinforced fibers; 540 g/m for the thermosetting resin; and 568.16 g/m for the covering resin. The setting weight for the final product was about 3500 g/m (actually measured weight: 3490 g/m).

<Example 2>

The setting temperature of the heating apparatus 104 was 300° C. A preferable covering resin was obtained, which was less in uneven thickness and exhibited a preferable surface with no wrinkles, although the degree of the gloss was degraded. The covering point P was set to be 120 mm forward from the front surface of the die 102, and the surface temperature of the resin was about 210° C.

<Example 3>

The setting temperature of each of the heaters 104a located on the upper and lower sides of the heating apparatus 104 was 350° C. The right and left heaters 104a were not operated. A substantially preferable covering resin was obtained, which was less in uneven thickness and was glossy, although wrinkles were slightly observed on the right and left ends.

<Comparative Example 1>

The testing was carried out in the same manner as that in Example 1 except that the heating apparatus 104 was not operated. A covering resin having a very irregular surface with wrinkles was obtained. The surface temperature of the resin at the covering point P was reduced to a value of 150 to 160° C.

<Comparative Example 2>

The testing was carried out in a condition that the heating apparatus 104 was not operated like Comparative Example 1, and the setting temperature of the die was raised to 250° C. and the clearance of the lip die was extended to 4.4 mm. A covering resin having a very irregular surface with wrinkles was obtained.

<Comparative Example 3>

The testing was carried out in the same manner as that in Example 1 except that evacuation was uniformly performed from holes vertically symmetrically formed in the nozzle and atmospheric air was not introduced. The degree of decompression (degree of vacuum) was changed in a range of 0 to 150 mm $H_2O$. When this degree was 100 mm $H_2O$ or less, the lower portion of the covering resin is sagged by its gravity, causing wrinkles at the central portion of the lower surface. When it was more than 100 mm $H_2O$, the covering resin was stuck on the front surface of the upper nozzle because of excessively high degree of decompression (degree of vacuum), causing breakage of the covering resin.

<Example 4>

The covering of the ABS resin was performed using the same die under the same condition as that in Example 1, except that the dimension of the center core made from ABS resin was set at 32.5 mm×30.2 mm; the shape of the final product was set at 240 mm in width and 35 mm in height; and the dimension of the hole portion of the nozzle 106 in the jacket was set at 238 mm×33 mm to increase the discharged amount by 2%. The covering point P was set to be 110 mm forward from the front surface of the die 102. At this position, the surface temperature of the resin at the central portion of the upper surface at the covering point P was about 220° C. This shows that the temperature is substantially equal to that of the resin directly after extrusion from the die. The covering resin thus formed was in good condition, that is, was less in uneven thickness and exhibited a preferable glossy surface with no wrinkles.

Next, there will be described a reference example in which a steel pipe having a diameter of 150 mm is covered with a resin.

<Reference Example>

A steel pipe having an outside diameter of 150 mm and an inside diameter of 134 mm was covered with HDPE resin to a thickness of 1 mm at a covering speed of 1 m/min. In this covering, a circular heating apparatus 4 was used, and the lower portion of the internal space S of the covering was evacuated.

The steel was held by guide rollers, being heated in a hot air heating furnace having a length of 3 m at 135° C., and was introduced in the cross head die 102. The shape of the die hole was the same as that in Example 1. HDPE resin, Hi-zex 6300MB (trade name, produced by Mitsui Chemicals Inc.) (MI =0.1) was extruded at an extrusion temperature of 200° C. for covering. A guide (bore: 152 mm) was provided at an introduction portion of the cross head die, and the steel pipe was sealed with Teflon rings (three stages) via a guide (equivalent to the nozzle in Example 1) on the front surface of the cross head die. To be more specific, the inside diameter of the steel pipe having an outside diameter of 150 mm was sealed to 152 to 150 mm via the introduction guide (guide plate) using the three Teflon rings. The evacuation was performed from the lower portion of the guide and an atmospheric air introduction port was provided at the corresponding upper position. The heating apparatus 4 has the bore of 420 mm and also the length of 250 mm, and the heating temperature thereof was controlled at only one point. The heating temperature was set at 260° C. and the degree of vacuum was set at 35 mm $H_2O$. The covering point P was set to be about 150 mm forward from the front surface of the die 102, and the surface temperature of the HDPE resin at the covering point P was set at about 190° C. A covering resin thus obtained had no wrinkles and less unevenness in thickness, and was good in adhesiveness.

<Comparative Example 4>

The covering of HDPE resin (Hi-zex 6300MB) was performed in the same manner as that in Example 5 except that the heating apparatus 104 was not used. A covering resin thus obtained had a very irregular surface with wrinkles. The surface temperature of the resin at the covering point P was reduced to a value of 150 to 160° C.

In the above-described examples, the covering point P is set forward from the front panel of the cross head die 102 and in the heating apparatus 104. However, even if the processing speed in the manufacturing line is increased and thereby the covering point P is shifted out of the heating apparatus 104, the heating effect of the heating apparatus 104 on the covering is kept (that is, the effect of improving adhesiveness as compared with the case without use of the heating apparatus 104). In this way, the heating effect of the heating apparatus 104 defers the reduction in temperature of the covering resin due to exposure to atmospheric air, thereby completing the covering while keeping the adhesiveness of the covering resin. Accordingly, the covering point P may be set inside or outside the heating apparatus 104; however, it is preferably set inside the heating apparatus 104.

<Modified Example>

The shape of each of the evacuation port 106b and the atmospheric air introduction port 106C is not limited to a complete round shape but may be a square hole or an elliptic hole. The positional relationship between a plurality of the evacuation ports 106b and the atmospheric air ports 106c is not particularly limited, that is, they may be disposed in a straight line along the squeezing nozzle hole 106a, or may be formed into one slot curved upward or downward or extending straightly, respectively. In summary, these ports are preferably provided to be somewhat separated from the covering resin or the center core portion for preventing uneven covering.

The shape of the discharge port for discharging the covering resin is not particularly limited to a complete round shape but may be an elliptic shape or a polygonal shape. In the case of the polygonal shape, and especially one having an acute angle, however, the angled portion is preferably rounded (i.e., an R is provided at the corner) for preventing occurrence of wrinkles of the covering resin.

As described in detail, according to the method of and apparatus for covering by molten thermoplastic resin according to the third invention, it is possible to uniformly cover a large-sized uncured center core portion having a cross-section diameter or one side of more than 100 mm with resin, while providing an enhanced surface state without wrinkles. Further, the use of the draft type cross head die having a discharge hole formed into an circular or elliptic shape allows change in dimension of the uncured center core portion to some extent, and allows change in the covering thickness.

In particular, in the process of manufacturing a large-sized fiber-reinforced composite hollow structure having a cross-sectional dimension of about 240 mm×30 mm, it is possible to carry out uniform covering without wrinkles, and further since the glass-fibers impregnated with an uncured resin are in contact with the covering resin in a molten-state, it is possible to improve the adhesive strength between the FRP portion and the covering resin.

If the dimension of the center core is changed, the same covering dye can be used to cope with this change. Further, since the uniform covering thickness can be ensured, the subsequent post-processing such as embossing for improving the decorative performance can be made easy.

-Fourth Invention-

<Example 1>

A FRP scaffold plate having a width of 240 mm and a thickness of 30 mm, wherein seven center cores made from an ABS resin are laterally arranged and each FRP leg is disposed between adjacent cores, was manufactured in the following procedure.

Figure 22:
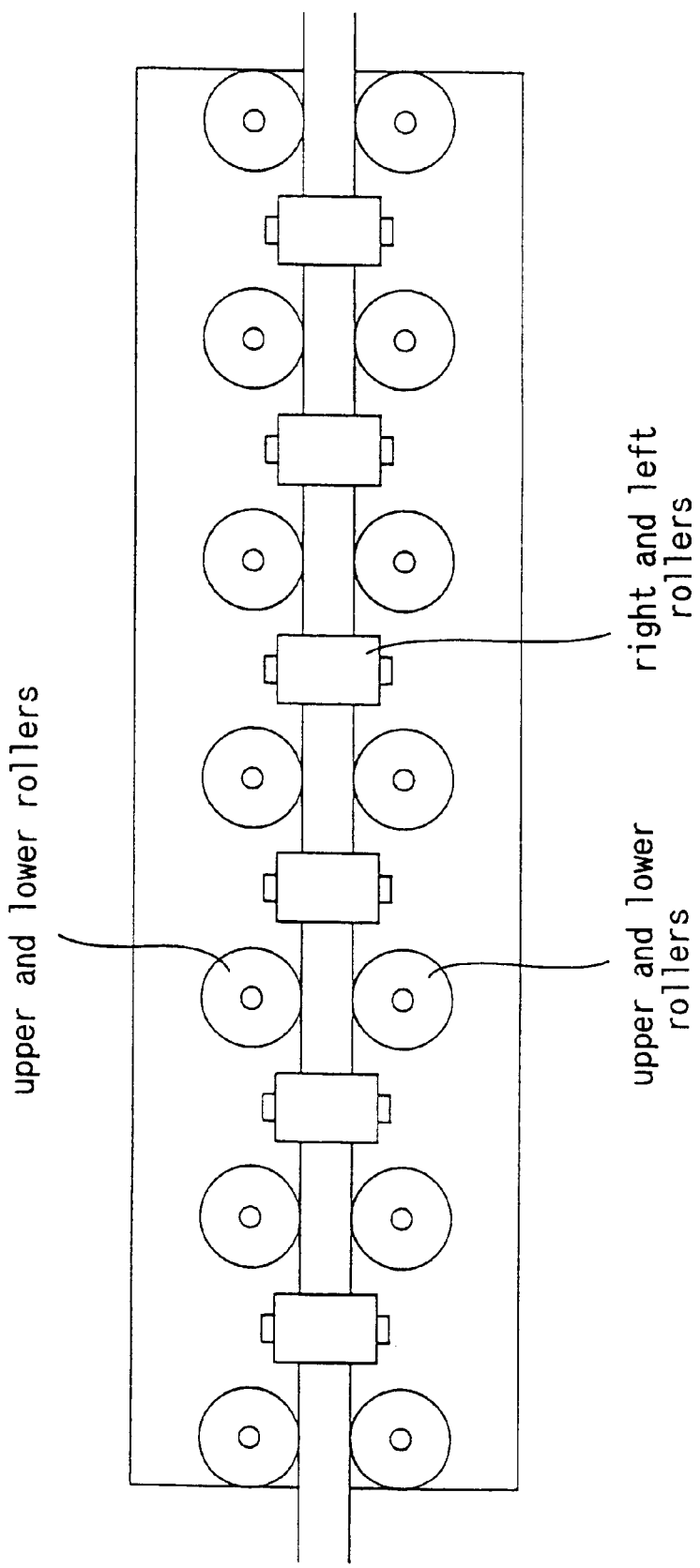
FIG. 22 is a side view of a roller sizing device according to one embodiment of a fourth invention, respectively.

First, center cores made from an ABS resin were extrusion-molded and shaped by vacuum sizing. Seven pieces of these center cores were juxtaposed and supplied. On the other hand, glass fibers were supplied from a roving stand, being impregnated with an unsaturated polyester resin in an impregnation bath, and were arranged around the center cores through dispersion guides. These glass fibers were then integrated with the center cores by squeezing an excessive amount of the unsaturated polyester resin through squeezing nozzles. (At this time, each leg was squeezed up to a specific GC.) Then, the resin of the FRP portion around the center cores was then further squeezed until the entire integrated product was formed into a specific shape (width: 238 mm. thickness: 28 mm). The product (the uncured center portion) thus obtained was introduced to a draft type cross head die having a bore of 350 mm. Then, an ABS resin was annularly extruded for covering. The region from the front portion of the die to the vicinity of the covering point was heated by a covering-resin heating apparatus, and the covered center core was subjected to sizing-molding from a position 10 mm apart from the covering point to the curing tank direction by a roller sizing apparatus. (For example, see in FIG. 22.) The covering point was about 110 mm apart from the front surface of the die. A first roller set and a second roller set were cooled by passing hot water at 50° C. and water at room temperature (about 20° C.) therethrough, respectively. The surfaces of first to third rollers of the first roller set were coated with Teflon. After sizing-molding, the uncured portion was cured in hot water at 95° C. in a hot water curing tank (see FIGS. 23(a) and 23(b)) in which five sets of sizing apparatuses each having five pairs of sizing rollers disposed only on the upper and lower sides. The cured product was then water-cooled in a cooling water bath, being drawn by a take-up device at a take-up speed of 1 m/min, and was cut by a cutter.

On the front surface of the cross head die, there was disposed a heating apparatus including four pieces of opposingly-disposed ceramic heaters each having a width of 400 mm and a length of 150 mm. (The two ceramic heaters on the right and left have a cutout portion of 50 mm in length for allowing the rollers to close up to 120 mm from the front surface of the die.) Thus, a heating space coaxial with the cross head die and having a dimension of about 400 mm square and 150 mm in length was formed. The heater was slidable to and from the cross head die. The temperature of the four heaters was independently controllable. The setting temperature of each of the right and left and upper heaters was set at 350° C. The covering point was set to be 110 mm apart from the front surface of the die. At this point, the temperature of the central portion of the upper surface of the resin was kept at about 220° C., which is substantially equal to that of the resin directly after extrusion.

With respect to the roller sizing apparatus, a clearance between upper and lower rollers was set at 31.5 mm for the two foremost pairs of the first roller set, and is 31.0 mm for No. 3 to No. 7 rollers and the second roller set. The value 31.0 mm is equivalent to "the average thickness of the product after curing"+"0.5 mm". A clearance between the right and left rollers was set at 241.5 mm for No. 1 and No. 2 rollers of the first roller set, and was 240.5 mm for No. 3 roller and the later and the second roller set. The value 240.5 mm is equivalent to "the average width of the product after curing"+"0.5 mm". The rollers in the curing tank are all upper and lower rollers, and there are no right and left rollers. The clearance of each of these rollers was set at 31.0 mm.

A FRP made scaffold plate thus obtained has no wrinkles and the surface stage is smooth in the width direction and longitudinal direction, is glossy, is accurate in shape, and is good in adhesiveness between the covering resin and the FRP portion. The accuracy of the thickness in the width direction was desirable, i.e., in the range of 29.9 to 30.6 mm.

<Example 2>

The sizing starting position of the first roller sizing apparatus was set to be on the downstream side of the heating apparatus (that is, 180 mm apart from the front surface of the die). The other configurations were the same as those in Example 1. The covering point was set at 110 mm from the front surface of the die. A FRP made scaffold plate thus obtained had slight marks (streaks) of the glass-fibers in the longitudinal direction but had no wrinkles, having a smooth surface in both the width direction and the longitudinal direction, being glossy, and good in adhesiveness between the covering resin and FRP portion. The accuracy of the thickness in the width direction was desirable, i.e., in the range of 29.8 to 30.6.

<Example 3>

A belt-like Teflon-impregnated glass cloth (embossing sheet) was wound on the three front pairs of the rollers on the front stage of the first roller sizing apparatus used in Example 1, and the deviation of the belt was prevented between right and left rollers. The other configurations were the same as those in Example 1. A smooth covering surface having a high decorative performance, with the embossing pattern of the belt transferred on the surface of the covering, was obtained. A FRP made scaffold plate thus obtained exhibited no wrinkles, had a smooth surface in both the width direction and the longitudinal direction, and was good in accuracy in shape and in adhesiveness between the covering resin and the FRP portion. The accuracy of the thickness in the width direction was good, that is, that thickness was in a range of 29.9 to 30.5 mm.

<Example 4>

One pair of the front rollers of the first roller sizing apparatus used in Example 1 was subjected to a treatment (embossed to have a scratch-brush finish) to give irregularities on the surfaces thereof, followed by Teflon coating. The other configurations were the same as those in Example 1. A smooth surface having a high decorative performance, with the embossing pattern of the surfaces of the rollers transferred on the surface of the covering resin, was obtained. A FRP scaffold plate thus obtained exhibited no wrinkles, had a smooth surface in both the width direction and the longitudinal direction, and was good in accuracy in shape and in adhesiveness between the covering resin and the FRP portion. The accuracy of the thickness in the width direction was good, that is, the thickness was in a range of 29.9 to 30.6 mm.

<Comparative Example 1>

The procedure in Example 1 was repeated except that the upper rollers and side rollers of the first and second roller sizing apparatuses after covering were not used. Streaks of glass fiber were observed on the surface of the covering resin, and the adhesiveness between the ABS resin and the FRP portion was reduced on the upper surface, the side surfaces, and the lower surfaces excluding the central portions. (That is, the covering floated upon cutting, or was easily peeled off with a cutter.) There was unevenness in the accuracy of the thickness in the width direction, that is, the thickness was in a range of 29.7 to 31.4 mm.

<Comparative Example 2>

In stead of the sizing apparatus (rollers) in the curing tank, there were used floating preventive rollers (only upper rollers arranged at an interval of 1 m in the curing tank (8 m in length)). The other configurations were the same as those in Examples 1. (The roller sizing after covering was similarly performed.) A FRP scaffold plate thus obtained exhibited no wrinkles, had a smooth surface in both the width direction and the longitudinal direction, and the accuracy of the thickness in the width direction was good, that is, the thickness was in a range of 29.8 to 30.8. The adhesiveness between the covering resin and the FRP portion was substantially good on the upper surface, but was poor on the lower surface excluding the side portions (i.e., on the central portion). Also slight camber in the width direction was observed. As a result of observation of the cross-section, some of the center cores were tilted.

<Comparative Example 3>

Like Comparative Example 1, as for the roller sizing apparatus used after covering, the upper and side rollers were not used and only lower rollers were used. Also, like Comparative Example 2, the floating preventive rollers (only upper rollers arranged at intervals of 1 m in the curing tank (8 m in length)) were used in the curing tank, and roller sizing was not carried out.

Streaks of glass fibers were observed on the surface of the covering resin, and adhesiveness between the ABS resin and the FRP portion was reduced on the upper surface, the side surfaces, and the lower surfaces except its central portion. The accuracy of the thickness in the width direction was poor; that is, the thickness was in a range of 29.7 to 31.5. Also, a slight camber in the width direction was observed. As a result of observation of the cross-section, some of the center cores were tilted.

<Comparative Example 4>

Instead of the roller-sizing apparatus, a water-cooling slide-type sizing apparatus (water bath) shown in FIG. 24 was provided after the hot-covering apparatus. The length of the slide type sizing portion was set at 80 mm. The front portion (introducing portion) of the sizing apparatus was tapered, and an evacuation port was provided at the interface between the tapered portion and the linear portion to prevent blowout of water on the covering die side.

The sizing-molding, however, could not be stably performed continuously. When the discharge amount of the covering resin was set at a small value, the sharpness at each right-angled corner was insufficient and caused water running from the corner portion. The water running was enlarged to cause insufficient suction of water. Consequently, the water reached the die along the covering, resulting in breakage of the covering. When the discharge amount of the covering resin was set at a larger value, the sizing resistance was increased and caused take-up mottles, thereby causing steps in the width direction. Even when the discharge amount was set at an intermediate value, there was often caused slight unevenness in thickness due to process variable factors (for example, disturbance of bundles of glass-fibers), which led to water running and resulting in breakage of the covering. As described above, since the width of sizing was wide (240 mm), stable sizing-molding was not performed.

Additionally, in test-manufacturing the 240×30 mm FRP-made scaffold plate, it is desired to perform roller sizing of the curing step after covering with thermosetting resin and cooling sizing as follows. The curing may be performed by dipping the uncured core portion in hot water at a temperature of 95 to 100° C. This is effective to equalize the curing temperature and hence to eliminate occurrence of partial mottle at a high reliability.

The rollers, each having a diameter of about 040 mm, were arranged at an interval of 200 mm or less from the entrance of the curing tank and at least up to a point in which the uncured core portion is cured (i.e., 0 to 6 m from the entrance, in this example). The rollers may be provided not on only the upper side but on both the upper and lower sides in pairs or in alternated arrangement.

The rollers were grouped into suitable blocks (the length of each block was about 1 m) for positional control. An escaping mechanism capable of opening a gap between adjacent rollers if an excessively thick portion comes close thereto to avoiding blocking may be provided. The same is true for the right and left rollers.

The control of the interval between the rollers and the interval setting range are to be the same as those for the rollers used after the covering step. The roller clearance was set wider for the ones positioned near the entrance of the curing tank, and was set at a value equivalent to the average thickness of the product for the rollers positioned near the curing point. If the roller clearance is narrow (or, set at a value equivalent to the thickness of the product) while the covering resin is still cooled and solidified, that is, not softened, there occurs an inconvenience that the resin may be squeezed and the take-up resistance may be increased.

A mechanism for cooling the rollers is not required, and the rollers may be freely rotated.

-Fifth Invention-

<Example 1>

Figure 25:
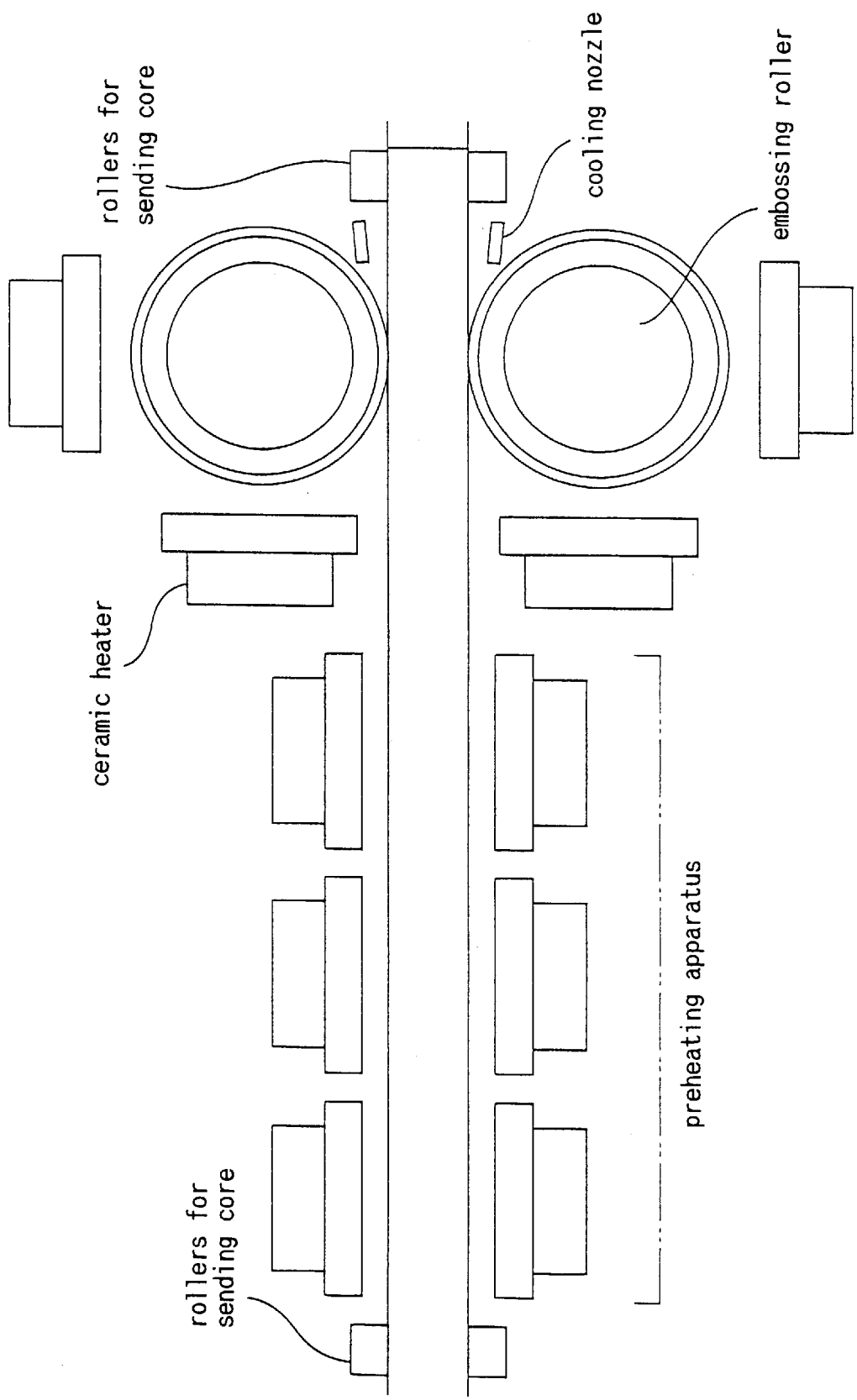
FIG. 25 is a side view of an embossing device according to a fifth invention.

A scaffold plate having a width of 240 mm and thickness of 30 mm and having a three layer structure comprising seven pieces of ABS resin made center cores juxtaposed at specific intervals, a FRP-made intermediate layer, and an ABS resin made outer covering layer was manufactured in accordance with the procedure described in Example 1 of the third invention, with the surface of its outer layer subjected to embossing finish by an apparatus shown in FIG. 25.

The scaffold plate was taken-up by a take-up device to pass through a pre-heating apparatus with a length of 900 mm and setting temperature of 300° C. and having upper and lower ceramic heaters. Then, the embossing finish was performed by pressing a pair of heating rollers each including a steel-made roller having a diameter of 230 □ around which a silicon rubber sheet and a wire-netting with a mesh-spacing of 10 mm and wire diameter of 2 mm were wound, to continuously transfer the meshes of the wire-netting onto the surface of the outer layer. Oil at 200° C. as a heating medium was circulated through the heating roller. The front and rear sides of the roller were heated from the exterior by ceramic heaters (setting temperature: 340° C.); and on the rear side of the roller, the surface of the composite hollow structure was cooled by an air nozzle, to enable easy release from the wire-netting. The air-flow rate was set to be 20,000 l/hr. In this way, there was obtained a composite hollow structure with the upper and lower covering surfaces uniformly embossed.

The antislipping effect was evaluated by, for example, a method of: tilting a sample cut into a suitable size, placing thereon a weight provided with a soft PVC or a rubber sheet stuck onto its bottom, changing the tilting angle of the sample, and evaluating the angle at which the weight starts to slip. This evaluation method was used for the present invention.

A sample was tilted using a laboratory jack by placing the longitudinal direction (take-up direction) of the sample in the tilting direction, and a weight having a bottom of commercially available slipper (soft PVC sheet) was put thereon. Two kinds of weights both different in weight and diameter were used. The height of the jack was changed by turning a handle slowly so as not to apply any vibration, and the tilting angle at which the weight slips down along the sample was evaluated. The tilting was expressed in tangent ("tan", height/base). For comparison, the test was also performed in a wet state by dropping water on the sample from a separating funnel. The measurement results for the scaffold plate of the present invention and a commercially available plywood-made plate, as a comparative example, are shown in Table 6. It becomes apparent that even in a wet state the weight does not slip down along the inventive sample at a tilting angle of 45° or more, and therefore, the present invention exhibits a desirable antislipping effect.

TABLE 6

| Sample | | A (φ30) Weight: 192 g | D (φ70) Weight: 1507 g |
|---|---|---|---|
| No wet by water | | | |
| No embossing | Comparative Example 1 | 1.075 | 0.81 |
| Plywood made scaffold board | Reference Example | 0.89 | 0.78 |
| Embossing by wire-netting | Example 1 | 1.50 or more | 1.00 or more; the weight is inclined |
| Embossing by wire-netting No pre-heating | Comparative Example 2 | 0.80 | — |
| Sand blasting | Pressurizing for 30 sec Example 2 | 0.86 | 0.78 |
| Sand blasting | Pressurizing for 30 sec Comparative Example 3 | 0.74 | 0.70 |

TABLE 6-continued

| Sample | | A (φ30) Weight: 192 g | D (φ70) Weight: 1507 g |
|---|---|---|---|
| Embossing by roller, embossing by wire-netting Wet by drop of water | Example 3 | 1.5 | — |
| No embossing | Comparative Example 1 | 0.64 | 0.69 |
| Plywood made scaffold board | Reference Example | 0.83 | 0.77 |
| Embossing by wire-netting | Example 1 | 1.24 | 1.00 or more |
| Embossing by wire-netting No pre-heating | Comparative Example 2 | 0.67 | |
| Sand blasting | Pressurizing for 30 sec Example 2 | 0.80 | 0.75 |
| Sand blasting | Pressurizing for 30 sec Comparative Example 3 | 0.68 | 0.63 |
| Embossing by roller, embossing by wire-netting | Example 3 | 1.32 | — |

<Comparative Example 1>

A composite hollow structure was manufactured in the same procedure as that in Example 1 except that the embossing finish using wire-netting was not performed. The antislipping effect of the structure thus obtained was evaluated. The result is shown in Table 6. It becomes apparent that the weight slips less along the sample in the non-wet state, but it slips very easily along the sample in the wet state.

<Comparative Example 2>

A composite hollow structure was manufactured in the same procedure as that in Example 1 except that pre-heating was not performed upon embossing finish using wire-netting. The antislipping effect of the structure thus obtained was evaluated. As a result, it becomes apparent that the irregularities given to the outer surface by embossing is insufficient, and the weight slips less along the sample in the non-wet state, but it slips very easily along the sample in the wet state.

<Example 2>

The composite hollow structure not subjected to embossing finish, obtained in Comparative Example 1, was cut into a length of 300 mm (width: 240 mm). The surface of the sample thus prepared was subjected to sand blasting using MYBLAST MY-30A (trade name) produced by Sinto Brator Corporation under the following conditions. As a blasting material, alundum #24 was used. Also, an injection nozzle having a diameter of 8 mm was used. The blasting material was sprayed to the entire surface from the injection nozzle placed at about 150 mm apart from the sample, at an air pressure of 0.4 Mpa (4 kg/cm$^2$) for 30 seconds per single surface. After the entire surface of the sample was uniformly subjected to sand blasting, the sample was evaluated in terms of antislipping effect by the same manner as that in Example 1. The result is shown in Table 6. It becomes apparent that the antislipping effect of the sample in the non-wet state and the wet state is comparative to that of the commercially available plywood, that is, it is satisfactory for practical use.

<Comparative Example 3>

The single surface of the composite hollow structure was subjected to sand blasting in the same manner as that in Example 2 except that the blasting time was set at 10 seconds. The antislipping effect thereof was evaluated. The result is shown in Table 6. It becomes apparent that the irregularities given to the surface of the outer layer is insufficient because of insufficient blasting time, and accordingly, it is impossible to obtain a sufficient antislipping effect.

<Example 3>

This example was modified from Example 1 in that a foremost pair of rollers of the first roller sizing apparatus used for sizing after covering were employed as embossing rollers (in which projections each having a size 0.5 mm (width)×1.0 mm (length)×1.0 mm (height) were arranged at a pitch of 0.85 mm). The surface of the outer layer was imparted a fine embossing pattern by the rollers after covering. Further, after drawing of the composite hollow structure, like Example 1, the surface of the outer layer was given an embossing pattern having large irregularities using wire-netting (spacing of mesh: 10 mm). The decorative characteristic of the outer layer was improved and also a sufficient antislipping effect was obtained.

According to this example, there was obtained a FRP made scaffold plate being reduced in weight, increased in both strength and rigidity, high in electric insulation, durability and corrosion resistance, and preferable in antislipping characteristics even in the wet state when used as a scaffold plate.

-Sixth Invention-

<Example>

A cap made from an ABS resin, shown in FIGS. 26(a) to (d), was formed by injection-molding. The cap comprises: a plate-like portion 301 having the shape being substantially equal to the cross-section of the end portion of a composite hollow structure, for example, having a width of 240.5 mm, height of 30.0 mm, and thickness of 7.0 mm; seven pairs of claw-like projecting portions 303 projecting from the plate-like portion 301, each pair being inserted into the hollow portion of each center core in contact with the upper and lower surfaces of the hollow portion; and a pair of claw-like portions 305, each being inserted into the hollow portion located at both ends of the structure in contact with the side surface of the hollow portion. The projection portions were formed in such a manner so that the space therebetween becomes larger toward the tip end side, and the tip ends of the projecting portions were chamfered at an acute angle. The width (height) between the chamfered tip end surfaces of a pair of the projecting portions was set at 20.0 mm which was smaller than the corresponding dimension of the hollow portion of the composite hollow structure (22.2 mm). The maximum width of the outer sides (i.e., outer side of the chamfered portions) of the claw-like projecting portions 303 was set at 24.0 mm which was slightly smaller than the corresponding dimension of the hollow portion of the composite hollow structure. The width of the claw-like projection (width of the inner side of the chamfered portion) was set at 20.0 mm which was 5 mm shorter than the width (25 mm) of the straight portion of the center core of the composite hollow structure. The projecting length of each of the projecting portions 303 and 305 was set at 18 mm. In addition, seven slots 307 (drain holes) close to the upper and lower surfaces of each of the hollow portions were formed.

The cap was adhesively fixed by coating the outer surfaces of the claw-like projecting portions and the outer surface of the plate-like claw portion with an adhesive containing a solvent such as toluene or MEK and inserting to the hollow portion. The cap was easily inserted, and after solidification of the adhesive, the cap could not be removed therefrom even when shock was imparted to the end portion of the composite hollow structure with a plastic hammer. A scaffold plate with a length of 3 m with its end portion thus processed was subjected to a drop test in which the scaffold plate was dropped from a height of 2 m to a concrete floor. As a result, the cap was deformed but the main body of the scaffold plate was not damaged.

<Comparative Example 1>

A composite hollow structure without its end portion being processed was subjected to the drop test, like the above Example. As a result, at the end portion, cracks of about 50 mm in the covering resin, cracks in the center cores, cracks in the FRP made intermediate layer, and peeling of the outer layer/intermediate layer/center core were observed at the end portion of the structure.

<Comparative Example 2>

Caps of a type being inserted into each of the hollow portions of a composite hollow structure in a one-to-one correspondence were prepared, and were inserted in the hollow portions and fixed thereto with an adhesive, alike the above Example. The dimension of a projection was set at 29.6×22.2 mm. Depending on the lot of the composite hollow structure, the caps could not be inserted in some of the hollow portions because of inadequate dimensional tolerances. The insertion of the caps required a lot of time, and the manufacturing cost was high because of the necessity to provide 14 pieces of caps per one composite hollow structure.

<Comparative Example 3>

An integral type cap having projecting portions to be inserted in hollow portions in contact with the entire inner peripheral surfaces was prepared for testing. Depending on the lot of the composite hollow structure, the projecting portions of the cap could not be inserted in the hollow portions.

<Comparative Example 4>

An integral type cap, in which three of the seven projecting portions in Comparative Example 3, i.e., the ones on the right and left sides and the one in the center were left and the other projecting portions were omitted, was prepared for testing. Although there were fewer portions compared to Comparative Example 3, some of the portions could not be inserted, depending on the lot of the structure. As a result of imparting shock to the end portion of the composite hollow structure by a plastic hammer after curing of the adhesive, the portions of the cap, at which the projecting portions were omitted, tended to float and form spaces.

<Comparative Example 5>

A cap in which the outer dimension of the plate-like portion is slightly larger than the cross-sectional shape of the end portion of a composite hollow structure was prepared, so that a flat portion projects from the outer periphery of the plate-like portion in such a manner as to surround and cover the end portion of the composite hollow structure from the outer side. The dimension of the cap was 246 mm in width, 37 mm in height, and 3 mm in wall thickness. This cap was easy in insertion and adhesive bonding and also desirable in workability; however, since a step was formed between the cap and the composite hollow structure, the cap often fell off upon transportation because of contact with another composite hollow structure. Further, the workability in stacking the composite hollow structures upon transportation or storage was poor because of the presence of the steps, and in the worst case, the stacked composite hollow structures tilted and collapsed.

What is claimed is:

1. A fiber-reinforced composite hollow structure, characterized in that a plurality of hollow center cores made from a thermoplastic resin, each of which is formed into an arbitrary shape such as a polygonal or circular shape in cross-section, are juxtaposed to each other in the horizontal, vertical or oblique direction;

said plurality of center cores are joined into one body by an intermediate layer formed of reinforcing long-fibers integrally bonded to each other with a thermosetting resin, whereby a leg portion, made from reinforcing long-fibers integrally bonded to each other with a thermosetting resin, is formed between each of said adjacent center cores; and the outer periphery of said intermediate layer is integrally covered with an outer layer made from a thermoplastic resin.

2. A fiber-reinforced composite hollow structure according to claim 1, wherein the hollow portion of at least two of said center cores are separated from each other by a leg made from a thermoplastic resin.

3. A fiber-reinforced composite hollow structure according to claim 1, wherein the thermoplastic resin for forming said center core is adhesive to said intermediate layer and has a thermal deformation temperature of 100° C. or more.

4. A fiber-reinforced composite hollow structure according to claim 1, wherein the wall thickness of said intermediate layer is 0.5 to 3 times the wall thickness of said center core, or, 0.5 to 3 times the wall thickness of said outer layer.

5. A fiber-reinforced composite hollow structure according to claim 1, wherein the thermoplastic resin for forming each of said center core and said outer layer is selected from styrene-based resins such as PS resin, AS resin, AES resin, AAS resin and ABS resin, and the thermosetting resin for forming said intermediate layer is an unsaturated polyester or a vinyl ester resin containing a styrene monomer as a crosslinking component.

6. A fiber-reinforced composite hollow structure according to claim 1, wherein a portion of said intermediate layer positioned at each corner of said center core is thicker than the rest of said intermediate layer.

7. A fiber-reinforced composite hollow structure according to claim 1, wherein the surface of said outer layer is provided with an antislipping function by imparting irregularities to the surface of said outer layer.

8. A fiber-reinforced composite hollow structure according to claim 1, wherein a protective cap made from a thermoplastic resin is fitted to an end of said center core, said cap comprising a planar plate-like portion having substantially the same shape as the cross-sectional shape of the end of said composite hollow structure, and a claw-like projecting portion which projects from said plate-like portion and which is expanded towards the tip end thereof, said projecting portion being separated in the peripheral direction.

* * * * *

UNITED STATES PATENT AND TRADEMARK OFFICE
CERTIFICATE OF CORRECTION

PATENT NO. : 6,607,798 B1
DATED : August 19, 2003
INVENTOR(S) : Watanabe et al.

It is certified that error appears in the above-identified patent and that said Letters Patent is hereby corrected as shown below:

<u>Title page,</u>
Item [22], PCT Filed, "Aug. 2, 1998" should be -- Apr. 2, 1998 --.

Signed and Sealed this

Twenty-third Day of September, 2003

JAMES E. ROGAN
*Director of the United States Patent and Trademark Office*